(12) United States Patent
Donaghey

(10) Patent No.: US 8,582,570 B2
(45) Date of Patent: *Nov. 12, 2013

(54) AUTOMATIC ATTACHMENT AND DETACHMENT FOR HUB AND PERIPHERAL DEVICES

(71) Applicant: Tri-County Excelsior Foundation, Marshall, TX (US)

(72) Inventor: Robert J Donaghey, Lexington, MA (US)

(73) Assignee: Tri-County Excelsior Foundation, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,866

(22) Filed: Feb. 4, 2013

(65) Prior Publication Data

US 2013/0265947 A1    Oct. 10, 2013

Related U.S. Application Data

(63) Continuation of application No. 13/430,650, filed on Mar. 26, 2012, which is a continuation of application No. 12/699,846, filed on Feb. 3, 2010, now Pat. No. 8,149,829, which is a continuation of application No. 11/728,246, filed on Mar. 23, 2007, now Pat. No. 7,756,129, which is a continuation of application No. 10/894,406, filed on Jul. 19, 2004, now Pat. No. 7,218,633, which is a continuation of application No. 09/535,591, filed on Mar. 27, 2000, now Pat. No. 6,804,232.

(51) Int. Cl.
*H04L 12/28* (2006.01)
*H04B 7/212* (2006.01)
*G06F 3/00* (2006.01)

(52) U.S. Cl.
USPC ............. 370/389; 370/347; 370/401; 710/17

(58) Field of Classification Search
USPC ................. 370/230–313, 338–347, 403–449; 709/224–229; 710/17–29
See application file for complete search history.

(56) References Cited

U.S. PATENT DOCUMENTS 4,549,293 A    10/1985 Christian et al.
4,775,931 A    10/1988 Dickie et al.
(Continued)

FOREIGN PATENT DOCUMENTS

CA    2179349 A1    12/1997
EP    874248 A2    10/1998
(Continued)

OTHER PUBLICATIONS

Office Action Summary in U.S. Appl. No. 13/430,650 dated Jun. 11, 2013.

(Continued)

*Primary Examiner* — Man Phan

(57) ABSTRACT

A network (100) includes a hub device (110) and at least one unattached peripheral device (120). The hub device comprises circuitry and a transceiver in communication with the circuitry. In operation, the hub device is configured to cause the transceiver to i) send a message to indicate the availability of the hub device for attachment to a first peripheral device, ii) receive, from the first peripheral device, a message indicating the availability of the first peripheral device for communication with the hub device, iii) send, to the first peripheral device, a signal including a first peripheral device identifier, iv) receive, from the first peripheral device, a response, v) send a hub response to the first peripheral device, and vi) receive, from the first peripheral device, a second peripheral response including the first peripheral device identifier.

30 Claims, 17 Drawing Sheets

(56) References Cited

U.S. PATENT DOCUMENTS

| | | | |
|---|---|---|---|
| 5,029,183 A | 7/1991 | Tymes | |
| 5,128,664 A | 7/1992 | Bishop | |
| 5,159,592 A | 10/1992 | Perkins | |
| 5,276,680 A | 1/1994 | Messenger | |
| 5,317,693 A | 5/1994 | Cuenod et al. | |
| 5,396,653 A | 3/1995 | Kivari | |
| 5,425,051 A | 6/1995 | Mahany et al. | |
| 5,428,748 A | 6/1995 | Davidson et al. | |
| 5,461,627 A | 10/1995 | Rypinski | |
| 5,502,726 A | 3/1996 | Fischer | |
| 5,550,816 A | 8/1996 | Hardwick et al. | |
| 5,572,528 A | 11/1996 | Shuen | |
| 5,594,782 A | 1/1997 | Zicker et al. | |
| 5,623,610 A | 4/1997 | Knoll et al. | |
| 5,657,317 A | 8/1997 | Mahany et al. | |
| 5,659,598 A | 8/1997 | Byrne et al. | |
| 5,682,379 A | 10/1997 | Mahany et al. | |
| 5,699,357 A * | 12/1997 | Carvey | 370/347 |
| 5,706,428 A | 1/1998 | Boer et al. | |
| 5,790,837 A | 8/1998 | Weir et al. | |
| 5,794,159 A | 8/1998 | Portin | |
| 5,812,819 A | 9/1998 | Rodwin et al. | |
| 5,835,723 A | 11/1998 | Andrews et al. | |
| 5,835,725 A | 11/1998 | Chiang et al. | |
| 5,842,125 A | 11/1998 | Modzelesky et al. | |
| 5,907,544 A | 5/1999 | Rypinski | |
| 5,909,430 A | 6/1999 | Reaves | |
| 5,926,101 A | 7/1999 | Dasgupta | |
| 5,928,345 A | 7/1999 | Tetzlaff et al. | |
| 5,938,742 A | 8/1999 | Faddell et al. | |
| 5,946,634 A | 8/1999 | Korpela | |
| 5,960,344 A | 9/1999 | Mahany | |
| 5,966,667 A | 10/1999 | Halloran et al. | |
| 5,974,475 A | 10/1999 | Day et al. | |
| 6,002,918 A | 12/1999 | Heiman et al. | |
| 6,006,100 A | 12/1999 | Koenck et al. | |
| 6,016,318 A | 1/2000 | Tomoike | |
| 6,052,725 A | 4/2000 | McCann et al. | |
| 6,058,106 A | 5/2000 | Cudak et al. | |
| 6,058,355 A | 5/2000 | Ahmed et al. | |
| 6,111,865 A | 8/2000 | Butler et al. | |
| 6,128,290 A * | 10/2000 | Carvey | 370/347 |
| 6,195,712 B1 | 2/2001 | Pawlowski et al. | |
| 6,272,140 B1 * | 8/2001 | LaRowe et al. | 370/403 |
| 6,308,227 B1 | 10/2001 | Kumar et al. | |
| 6,311,165 B1 | 10/2001 | Coutts et al. | |
| 6,314,019 B1 | 11/2001 | Kuekes et al. | |
| 6,331,972 B1 * | 12/2001 | Harris et al. | 370/313 |
| 6,351,468 B1 * | 2/2002 | LaRowe et al. | 370/449 |
| 6,353,614 B1 | 3/2002 | Borella et al. | |
| 6,393,261 B1 | 5/2002 | Lewis | |
| 6,424,623 B1 * | 7/2002 | Borgstahl et al. | 370/230 |
| 6,445,690 B2 | 9/2002 | Sato et al. | |
| 6,445,691 B2 | 9/2002 | Sato | |
| 6,478,180 B1 | 11/2002 | Dehn, Sr. | |
| 6,507,873 B1 | 1/2003 | Suzuki et al. | |
| 6,507,953 B1 | 1/2003 | Horlander et al. | |
| 6,519,634 B1 | 2/2003 | Song et al. | |
| 6,529,119 B1 | 3/2003 | Kumar et al. | |
| 6,532,368 B1 | 3/2003 | Hild et al. | |
| 6,539,488 B1 | 3/2003 | Tota et al. | |
| 6,556,820 B1 | 4/2003 | Le et al. | |
| 6,560,443 B1 | 5/2003 | Vaisanen et al. | |
| 6,567,396 B1 | 5/2003 | Pohjanvouri et al. | |
| 6,570,857 B1 | 5/2003 | Haartsen et al. | |
| 6,570,875 B1 | 5/2003 | Hegde | |
| 6,571,103 B1 | 5/2003 | Novakov | |
| 6,574,266 B1 | 6/2003 | Haartsen | |
| 6,580,704 B1 | 6/2003 | Wellig | |
| 6,590,928 B1 | 7/2003 | Haartsen | |
| 6,600,726 B1 | 7/2003 | Nevo et al. | |
| 6,600,734 B1 | 7/2003 | Gernert et al. | |
| 6,603,744 B2 | 8/2003 | Mizutani et al. | |
| 6,603,758 B1 | 8/2003 | Schmuelling et al. | |
| 6,606,323 B1 | 8/2003 | Ramamurthy et al. | |
| 6,614,788 B1 | 9/2003 | Martin et al. | |
| 6,615,285 B1 | 9/2003 | Schafranek et al. | |
| 6,618,764 B1 | 9/2003 | Shteyn | |
| 6,622,011 B1 | 9/2003 | Joeressen et al. | |
| 6,640,268 B1 | 10/2003 | Kumar | |
| 6,650,871 B1 | 11/2003 | Cannon et al. | |
| 6,665,536 B1 | 12/2003 | Mahany | |
| 6,691,173 B2 | 2/2004 | Morris et al. | |
| 6,697,638 B1 | 2/2004 | Larsson et al. | |
| 6,701,377 B2 | 3/2004 | Burmann et al. | |
| 6,772,331 B1 | 8/2004 | Hind et al. | |
| 6,775,273 B1 | 8/2004 | Kung et al. | |
| 6,810,520 B2 | 10/2004 | Lu et al. | |
| 6,845,090 B1 | 1/2005 | Takabatake et al. | |
| 6,853,851 B1 | 2/2005 | Rautiola et al. | |
| 6,874,147 B1 | 3/2005 | Diamant | |
| 6,874,174 B2 | 4/2005 | Worthington | |
| 6,891,820 B1 | 5/2005 | Pham et al. | |
| 6,892,230 B1 | 5/2005 | Gu et al. | |
| 6,894,988 B1 | 5/2005 | Zehavi | |
| 6,917,626 B1 | 7/2005 | Duvvury | |
| 6,937,615 B1 | 8/2005 | Lazzarotto et al. | |
| 6,944,145 B2 | 9/2005 | Takabatake | |
| 6,947,398 B1 | 9/2005 | Ahmed et al. | |
| 6,973,067 B1 | 12/2005 | Haartsen | |
| 6,980,660 B1 | 12/2005 | Hind et al. | |
| 6,990,082 B1 | 1/2006 | Zehavi et al. | |
| 7,013,138 B2 | 3/2006 | Mahany | |
| 7,042,863 B1 | 5/2006 | Morris | |
| 7,046,649 B2 | 5/2006 | Awater et al. | |
| 7,068,171 B2 | 6/2006 | Gärdenfors et al. | |
| 7,107,052 B2 | 9/2006 | Mahany | |
| 7,126,926 B1 | 10/2006 | Bjorklund et al. | |
| 7,161,941 B1 | 1/2007 | Schmidl et al. | |
| 7,197,326 B2 | 3/2007 | Acampora | |
| 7,239,615 B2 | 7/2007 | Nevo et al. | |
| 7,245,651 B1 | 7/2007 | Miao et al. | |
| 7,254,131 B2 | 8/2007 | Brewer | |
| 7,382,786 B2 | 6/2008 | Chen et al. | |
| 7,403,366 B2 | 7/2008 | Melchert et al. | |
| 7,424,024 B2 | 9/2008 | Chen et al. | |
| 7,577,725 B1 | 8/2009 | Sitaraman et al. | |
| 7,606,243 B2 | 10/2009 | Takabatake et al. | |
| 7,616,621 B2 | 11/2009 | Morris | |
| 7,697,470 B2 | 4/2010 | Morris | |
| 7,710,907 B2 | 5/2010 | Mahany | |
| 7,733,885 B2 | 6/2010 | Ayyagari et al. | |
| 7,856,003 B2 | 12/2010 | Mahany | |
| 8,010,042 B2 | 8/2011 | Judd et al. | |
| 8,027,320 B2 | 9/2011 | Beach | |
| 2001/0002912 A1 | 6/2001 | Tony et al. | |
| 2001/0011301 A1 | 8/2001 | Sato et al. | |
| 2007/0083287 A1 | 4/2007 | Defosse et al. | |
| 2007/0109994 A1 | 5/2007 | Beach | |
| 2010/0189041 A1 | 7/2010 | Morris et al. | |
| 2011/0051018 A1 | 3/2011 | Shintani et al. | |

FOREIGN PATENT DOCUMENTS

| | | | |
|---|---|---|---|
| GB | 2309856 A | | 8/1997 |
| JP | 10247927 | | 9/1998 |
| JP | 2000069046 A | | 3/2000 |
| WO | 9504322 | | 2/1995 |
| WO | 9747125 A1 | | 12/1997 |
| WO | 9748243 | | 12/1997 |
| WO | 9914897 A2 | | 3/1999 |
| WO | 9916214 | | 4/1999 |
| WO | WO02080464 | | 10/2002 |

OTHER PUBLICATIONS

Office Action Summary in U.S. Appl. No. 13/789,544 dated Jun. 10, 2013.
Office Action Summary in U.S. Appl. No. 13/789,576 dated Jun. 10, 2013.
U.S. Appl. No. 13/430,650 dated Mar. 26, 2012.
U.S. Appl. No. 13/754,807 dated Jan. 30, 2013.
U.S. Appl. No. 13/763,604 dated Feb. 8, 2013.
U.S. Appl. No. 13/763,609 dated Feb. 8, 2013.

(56) References Cited

OTHER PUBLICATIONS

U.S. Appl. No. 13/789,544 dated Mar. 7, 2013.
U.S. Appl. No. 13/789,576 dated Mar. 7, 2013.
Documents from Case 6:11-cv-00139.
Office Action Summary in U.S. Appl. No. 13/763,604 dated Jul. 8, 2013.
Notice of Allowance in U.S. Appl. No. 13/763,604 dated Aug. 7, 2013.
Notice of Allowance in U.S. Appl. No. 13/941,431 dated Aug. 27, 2013.
U.S. Appl. No. 13/941,427, filed Jul. 12, 2013.
U.S. Appl. No. 13/941,431, filed Jul. 12, 2013.
V. Bhagharhavan, "A Dynamic Addressing Scheme for Wireless Media Access," IEEE, Feb. 1995.
Bilgic, M., "A PCS Terminal Architecture to Access Multiple Networks," Omnipoint Corporation, 1996.
Schiller, J.; Rosenstein, M., "A Protocol for the Dynamic Assignment of IP Addresses for use on the Ethernet," Massachusetts Institute of Technology, Sep. 1988.
Finlayson, R.; Mann, T.; Mogul, J.; Theimer, M., "A Reverse Address Resolution Protocol (RARP)," Computer Science Department, Stanford University, Jun. 1984.
"ACCESS.bus, Specifications, Version 3.0," ACCESS.bus Industry Group, Sep. 1995.
"Am79C930, PCnet™—Mobile, Single-Chip Wireless LAN Media Access Controller," Advanced Micro Devices, Inc., Apr. 1997.
T. Ors et al., "Analysis of an Adaptive Random Reservation MAC Protocol," VTC, Apr. 1998.
Newman, P., "ATM Local Area Networks," IEEE Communications Magazine, Mar. 1994.
Banyan VINES docwiki.cisco.com, Dec. 17, 2009.
Haartsen, J., "Baseband Overview," Ericsson Mobile Communications, Oct. 1998.
P. Bhagwat et al., "BlueSky: A Cordless Networking Solution for Palmtop Computers," Mobicom '99, Sep. 1999.
Kardach, J., "Bluetooth Architecture Overview," Intel Corporation, 1998.
R. Morrow, "Bluetooth Operation and Use," McGraw-Hill, 2002.
"Bluetooth Whitepaper," AU-System, Jan. 2000.
Haartsen, J.; Allen, et al., "Bluetooth: Vision, Goals and Architecture," Mobile Computing and Communications Review, vol. 1, No. 2, 1998.
Barber, T., "BodyLAN™: A Low-Power Communications System," Massachusetts Institute of Technology, Feb. 1996.
Croft, B.; Gilmore, J., "Bootstrap Protocol (BOOTP)," Sep. 1995.
Shellhammer, S., "Coexistence Task Group Project Authorization Request (PAR)," IEEE, Sep. 15, 1999.
"Comprehensive Description of the Bluetooth System," Bluetooth SIG, Jun. 17, 1998.
"DECT Standard, ETS 300 175-1, Digital Enhanced Cordless Telecommunications," ETSI, Sep. 1996.
"DECT Standard, ETS 300 175-3, Digital Enhanced Cordless Telecommunications," ETSI, Sep. 1996.
"DECT Standard, ETS 300 175-5, Digital Enhanced Cordless Telecommunications," ETSI, Jun. 1996.
Droms, R., "Dynamic Host Configuration Protocol, RFC 1531," Bucknell University, Oct. 1993.
Droms, R., "Dynamic Host Configuration Protocol, RFC 1541," Bucknell University, Oct. 1993.
Droms, R., Dynamic Host Configuration Protocol, RFC 2131, Bucknell University, Mar. 1997.
Zyren, J., "Extension of Bluetooth and 802.11 Direct Sequence Interference Model," Harris Semiconductor, Nov. 11, 1998.
"Harris Semiconductor to Develop a Single-Chip PHY for Frequency Hopped Wireless Networking," Harris, Oct. 22, 1998.
Diepstraten, W.; Belanger, P., "IEEE 802.11 Tutorial, MAC Basic Access Mechanism Privacy and Access Control," IEEE, Mar. 1996.
J. Zyren, "IEEE 802.11—98/378 Extension of Bluetooth and 802.11 Direct Sequence Interference Model," Harris Semiconductor, Nov. 11, 1998.
O'Hara, B.; Petrick, A., "IEEE 802.11 Handbook: A Designer's Companion," The IEEE Press, 1999.
"IEEE 802.11 Specifications," IEEE, 1997.
"IEEE Standard 802.2," IEEE, 1998.
Ennis, G., "Impact of Bluetooth on 802.11 Direct Sequence," Ennis Associates, Sep. 15, 1998.
Chang, H.; Sunwoo, M., "Implementation of a DSSS Modem ASIC Chip for Wireless LAN," Oct. 8, 1998.
Sidhu, G.; Andrews, R.; Oppenheimer, A., "Inside AppleTalk, Second edition," Addison-Wesley Publishing Co., Inc., 1990.
"IrDA Control Specification 1.0," Infrared Data Association, Jun. 30, 1998.
"ISO/IEC 7498-1," ISO/IEC, Nov. 15, 1994.
Dayem, R., "Mobile Data and Wireless LAN Technologies," Prentice Hall PTR, 1997.
P. Bhagwat, "Networking over Bluetooth: Overview and issues," IBM, Feb. 29, 2000.
Kahn, J.; Barry, J.; Audeh, M.; Carruthers, J.; Krause, W.; Marsh, G., "Non-Directed Infrared Links for High-Capacity Wireless LANs," IEEE Personal Communications, 1994.
S. Preus, et al., "Overview of Spontaneous Networking—Evolving Concepts and Technologies," University of Rostock, Germany, 1998.
"PCD5095, DECT baseband controller," Philips Semiconductors, Nov. 19, 1997.
G. Maguire, Jr., "Personal Computing and Communication: the Near Future," Royal Institute of Technology, Stokholm, Nov. 10, 1998.
Li, Y.; Leung, V., "Protocol Architecture for Universal Personal Computing," IEEE Journal on Selected Areas in Communications, Oct. 1997.
"Shared Wireless Access Protocol (Cordless Access) Specification 1.21," The HomeRF Technical Committee, Jan. 27, 1999.
P. Johansson, et al., "Short Range Radio Based Ad-hoc Networking: Performance and Properties," IEEE, 1999.
"Specification of the Bluetooth System, v1.0," Bluetooth SIG, Dec. 1, 1999.
"Specification of the Bluetooth System, v0.7," Bluetooth SIG, Oct. 15, 1998.
"Specification of the Bluetooth System, v0.8," Bluetooth SIG, Jan. 21, 1999.
Tourrilhes, J., "SWAP and TCP performance," HP Laboratories, Mar. 23, 1998.
J. Haartsen, et al., "The Bluetooth Radio System," IEEE Personal Communications, Feb. 2000.
I. Millar et al., "The IrDA Standard for High-Speed Infrared Communications," Hewlett Packard, Feb. 1998.
N. Johansson, "Wireless Ad-hoc Networking with Bluetooth," Lund University, Sweden, 1999.

\* cited by examiner

AUTOMATIC ATTACHMENT AND DETACHMENT FOR HUB AND PERIPHERAL DEVICES

RELATED APPLICATIONS

This application is a continuation of U.S. patent application Ser. No. 13/430,650 filed on Mar. 26, 2012, which is a continuation of U.S. patent application Ser. No. 12/699,846 filed on Feb. 3, 2010, now U.S. Pat. No. 8,149,829, which is a continuation of U.S. patent application Ser. No. 11/728,246 filed on Mar. 23, 2007, now U.S. Pat. No. 7,756,129, which is a continuation of U.S. patent application Ser. No. 10/894,406 filed on Jul. 19, 2004, now U.S. Pat. No. 7,218,633, which is a continuation of U.S. patent application Ser. No. 09/535,591 filed on Mar. 27, 2000, now U.S. Pat. No. 6,804,232, which is related to U.S. patent application Ser. No. 09/536,191 filed on Mar. 27, 2000, all of which are incorporated herein by reference in their entirety for all purposes.

BACKGROUND AND FIELD OF THE INVENTION

A. Field of the Invention

The present invention relates to network protocols and, more particularly, to attachment protocols for use in a network.

B. Description of Related Art

Over the last decade, the size and power consumption of digital electronic devices has been progressively reduced. For example, personal computers have evolved from laptops and notebooks into hand-held or belt-carriable devices commonly referred to as personal digital assistants (PDAs). One area of carriable devices that has remained troublesome, however, is the coupling of peripheral devices or sensors to the main processing unit of the PDA. Generally, such coupling is performed through the use of connecting cables. The connecting cables restrict the handling of a peripheral in such a manner as to lose many of the advantages inherent in the PDA's small size and light weight. For a sensor, for example, that occasionally comes into contact with the PDA, the use of cables is particularly undesirable.

While some conventional systems have proposed linking a keyboard or a mouse to a main processing unit using infrared or radio frequency (RF) communications, such systems have typically been limited to a single peripheral unit with a dedicated channel of low capacity.

Based on the foregoing, it is desirable to develop a low power data network that provides highly reliable bidirectional data communication between a host or server processor unit and a varying number of peripheral units and/or sensors while avoiding interference from nearby similar systems.

SUMMARY OF THE INVENTION

Systems and methods consistent with the present invention address this need by providing a wireless personal area network that permits a host unit to communicate with peripheral units with minimal interference from neighboring systems.

A system consistent with the present invention includes a hub device and at least one unattached peripheral device. The unattached peripheral device transmits an attach request to the hub device with a selected address, receives a new address from the hub device to identify the unattached peripheral device, and communicates with the hub device using the new address.

In another implementation consistent with the present invention, a method for attaching an unattached peripheral device to a network having a hub device connected to multiple peripheral devices, includes receiving an attach request from the unattached peripheral device, the attach request identifying the unattached peripheral device to the hub device; generating a new address to identify the unattached peripheral device in response to the received attach request; sending the new address to the unattached peripheral device; and sending a confirmation message to the unattached peripheral device using the new address to attach the unattached peripheral device.

In yet another implementation consistent with the present invention, a method for attaching an unattached peripheral device to a network having a hub device connected to a set of peripheral devices, includes transmitting an attach request with a selected address to the hub device; receiving a new address from the hub device to identify the unattached peripheral device; and attaching to the network using the new address.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a wireless personal area network that permits a host device to communicate with a varying number of peripheral devices with minimal interference from neighboring networks. The host device uses tokens to manage all of the communication in the network, and automatic attachment and detachment mechanisms to communicate with the peripheral devices.

Network Overview

A Personal Area Network (PAN) is a local network that interconnects computers with devices (e.g., peripherals, sensors, actuators) within their immediate proximity. These devices may be located nearby and may frequently or occasionally come within range and go out of range of the computer. Some devices may be embedded within an infrastructure (e.g., a building or vehicle) so that they can become part of a PAN as needed.

A PAN, in an implementation consistent with the present invention, has low power consumption and small size, supports wireless communication without line-of-sight limitations, supports communication among networks of multiple devices (over 100 devices), and tolerates interference from other PAN systems operating within the vicinity. A PAN can also be easily integrated into a broad range of simple and complex devices, is low in cost, and is capable of being used worldwide.

Figure 1:
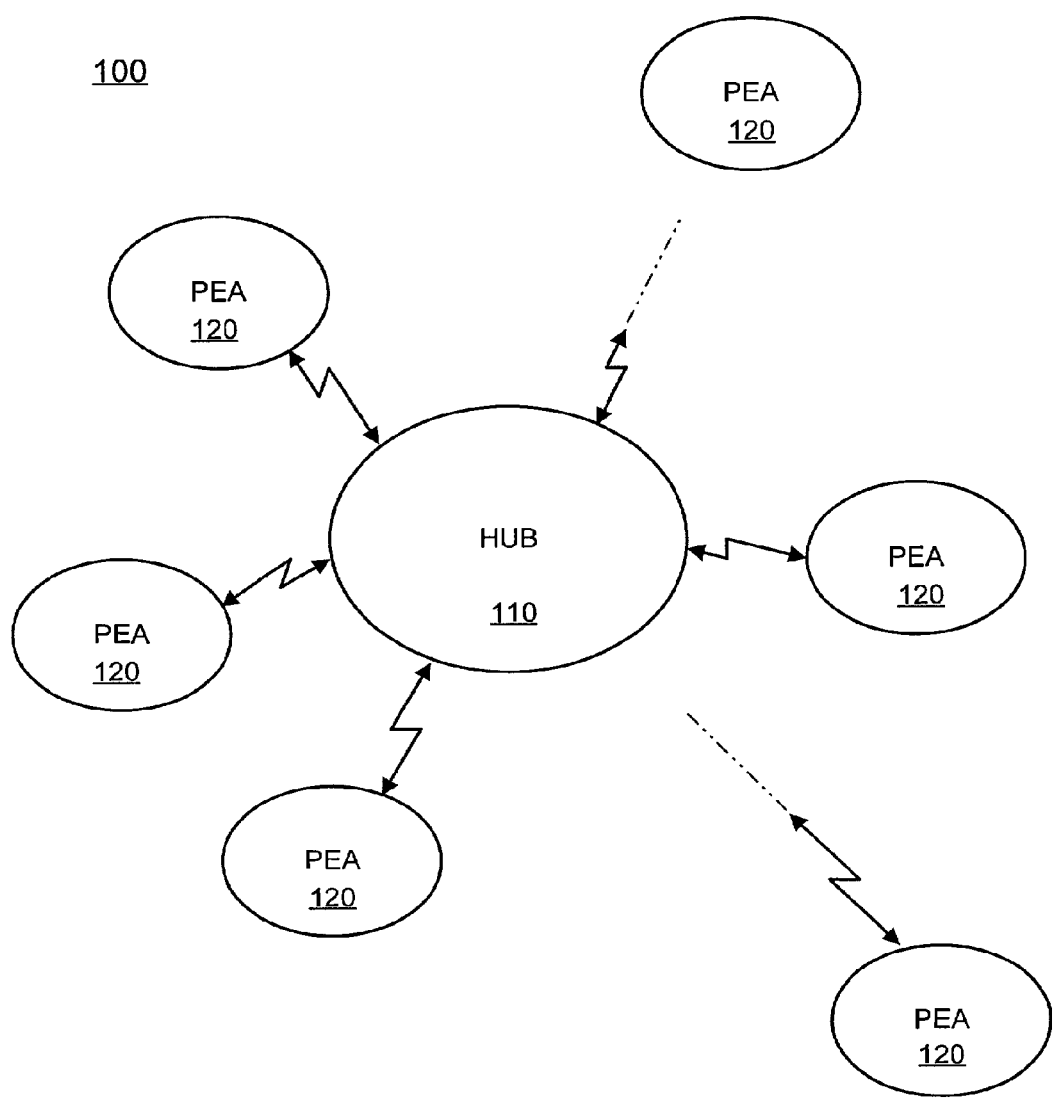
FIG. 1 is a diagram of a personal area network (PAN) in which systems and methods consistent with the present invention may be implemented.

FIG. 1 is a diagram of a PAN 100 consistent with the present invention. The PAN 100 includes a single Hub device 110 surrounded by multiple Personal Electronic Accessory (PEA) devices 120 configured in a star topology. Other topologies may also be possible. Each device is identified by a Media Access (MAC) address.

The Hub 110 orchestrates all communication in the PAN 100, which consists of communication between the Hub 110 and one or more PEA(s) 120. The Hub 110 manages the timing of the network, allocates available bandwidth among the currently attached PEAs 120 participating in the PAN 100, and supports the attachment, detachment, and reattachment of PEAs 120 to and from the PAN 100.

The Hub 110 may be a stationary device or may reside in some sort of wearable computer, such as a simple pager-like device, that may move from peripheral to peripheral. The Hub 110 could, however, include other devices.

The PEAs 120 may vary dramatically in terms of their complexity. A very simple PEA might include a movement sensor having an accelerometer, an 8-bit microcontroller, and a PAN interface. An intermediate PEA might include a bar code scanner and its microcontroller. More complex PEAs might include PDAs, cellular telephones, or even desktop PCs and workstations. The PEAs may include stationary devices located near the Hub and/or portable devices that move to and away from the Hub.

The Hub 110 and PEAs 120 communicate using multiplexed communication over a predefined set of streams. Logically, a stream is a one-way communications link between one PEA 120 and its Hub 110. Each stream has a predetermined size and direction. The Hub 110 uses stream numbers to identify communication channels for specific functions (e.g., data and control).

The Hub 110 uses MAC addresses to identify itself and the PEAs 120. The Hub 110 uses its own MAC address to broadcast to all PEAs 120. The Hub 110 might also use MAC addresses to identify virtual PEAs within any one physical PEA 120. The Hub 110 combines a MAC address and a stream number into a token, which it broadcasts to the PEAs 120 to control communication through the network 100. The PEA 120 responds to the Hub 110 if it identifies its own MAC address or the Hub MAC address in the token and if the stream number in the token is active for the MAC address of the PEA 120.

Exemplary Hub Device

Figure 2:
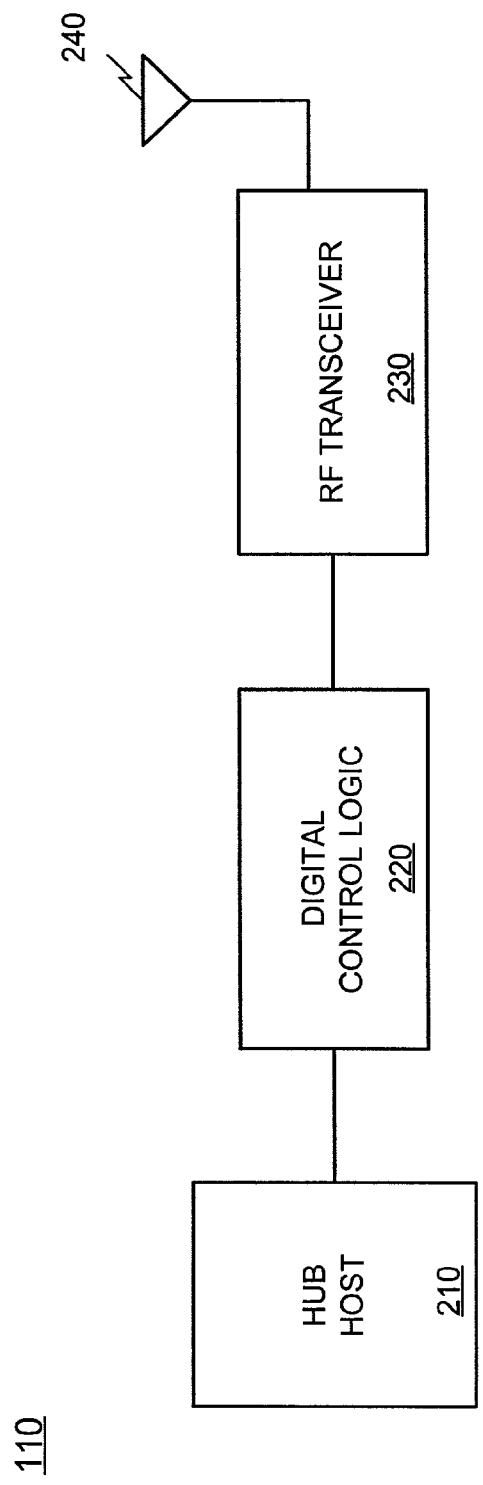
FIG. 2 is a simplified block diagram of the Hub of FIG. 1.

FIG. 2 is a simplified block diagram of the Hub 110 of FIG. 1. The Hub 110 may be a battery-powered device that includes Hub host 210, digital control logic 220, radio frequency (RF) transceiver 230, and an antenna 240.

Hub host 210 may include anything from a simple microcontroller to a high performance microprocessor. The digital control logic (DCL) 220 may include a controller that maintains timing and coordinates the operations of the Hub host 210 and the RF transceiver 230. The DCL 220 is specifically designed to minimize power consumption, cost, and size of the Hub 110. Its design centers around a time-division multiple access (TDMA)-based network access protocol that exploits the short range nature of the PAN 100. The Hub host 210 causes the DCL 220 to initialize the network 100, send tokens and messages, and receive messages. Responses from the DCL 220 feed incoming messages to the Hub host 210.

The RF transceiver 230 includes a conventional RF transceiver that transmits and receives information via the antenna 240. The RF transceiver 230 may alternatively include separate transmitter and receiver devices controlled by the DCL 220. The antenna 240 includes a conventional antenna for transmitting and receiving information over the network.

While FIG. 2 shows the exemplary Hub 110 as consisting of three separate elements, these elements may be physically implemented in one or more integrated circuits. For example, the Hub host 210 and the DCL 220, the DCL 220 and the RF transceiver 230, or the Hub host 210, the DCL 220, and the RF transceiver 230 may be implemented as a single integrated circuit or separate integrated circuits. Moreover, one skilled in the art will recognize that the Hub 110 may include additional elements that aid in the sending, receiving, and processing of data.

Exemplary PEA Device

Figure 3:
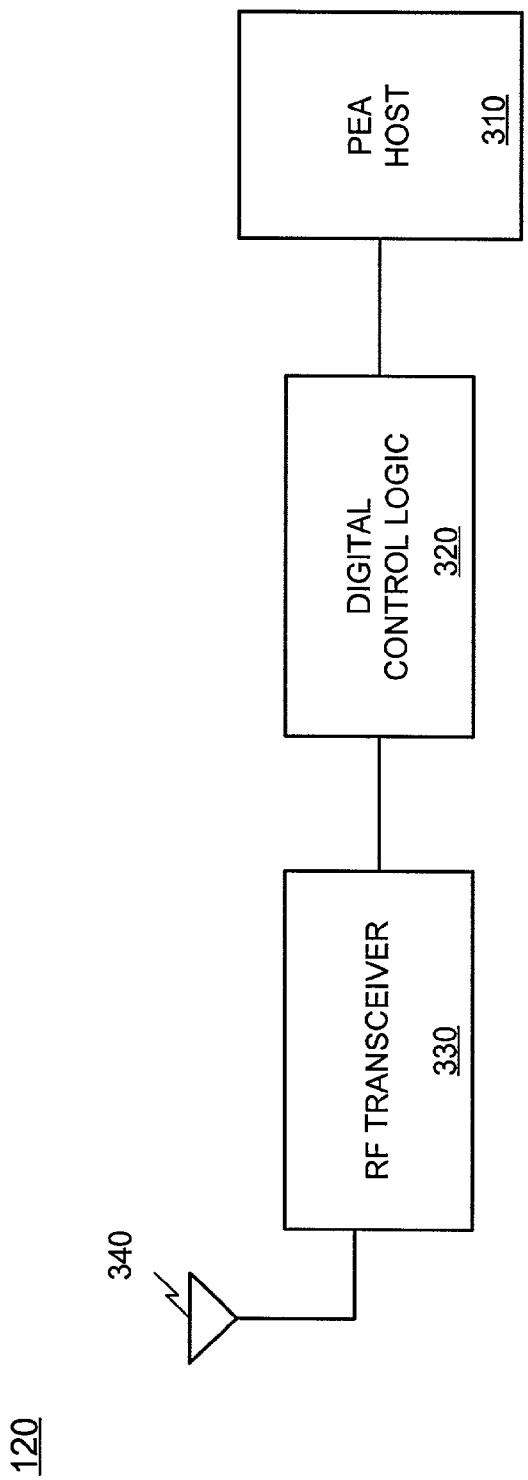
FIG. 3 is a simplified block diagram of a PEA of FIG. 1.

FIG. 3 is a simplified block diagram of the PEA 120. The PEA 120 may be a battery-powered device that includes a PEA host 310, DCL 320, RF transceiver 330, and an antenna 340. The PEA host 310 may include a sensor that responds to information from a user, an actuator that provides output to the user, a combination of a sensor and an actuator, or more complex circuitry, as described above.

The DCL 320 may include a controller that coordinates the operations of the PEA host 310 and the RF transceiver 330. The DCL 320 sequences the operations necessary in establishing synchronization with the Hub 110, in data communications, in coupling received information from the RF transceiver 330 to the PEA host 310, and in transmitting data from the PEA host 310 back to the Hub 110 through the RF transceiver 330.

The RF transceiver 330 includes a conventional RF transceiver that transmits and receives information via the antenna 340. The RF transceiver 330 may alternatively include separate transmitter and receiver devices controlled by the DCL 320. The antenna 340 includes a conventional antenna for transmitting and receiving information over the network.

While FIG. 3 shows the exemplary PEA 120 as consisting of three separate elements, these elements may be physically implemented in one or more integrated circuits. For example, the PEA host 310 and the DCL 320, the DCL 320 and the RF transceiver 330, or the PEA host 310, the DCL 320, and the RF transceiver 330 may be implemented as a single integrated circuit or separate integrated circuits. Moreover, one skilled in the art will recognize that the PEA 120 may include additional elements that aid in the sending, receiving, and processing of data.

Exemplary Software Architecture

Figure 4:
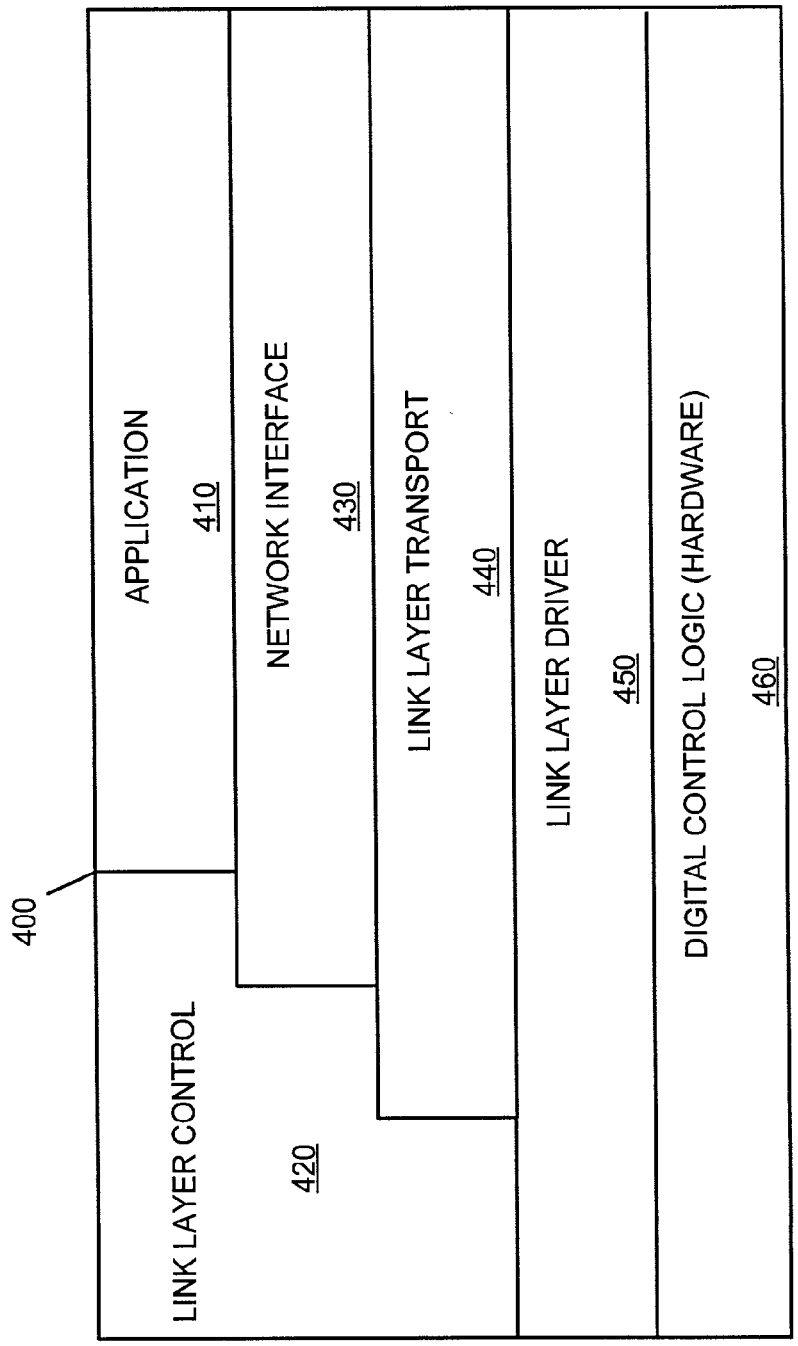
FIG. 4 is a block diagram of a software architecture of a Hub or PEA in an implementation consistent with the present invention.

FIG. 4 is an exemplary diagram of a software architecture 400 of the Hub 110 in an implementation consistent with the present invention. The software architecture 400 in the PEA 120 has a similar structure. The software architecture 400 includes several distinct layers, each designed to serve a specific purpose, including: (1) application 410, (2) link layer control (LLC) 420, (3) network interface (NI) 430, (4) link layer transport (LLT) 440, (5) link layer driver (LLD) 450, and (6) DCL hardware 460. The layers have application programming interfaces (APIs) to facilitate communication with lower layers. The LLD 450 is the lowest layer of software. Each layer may communicate with the next higher layer via procedural upcalls that the higher layer registers with the lower layer.

The application 410 may include any application executing on the Hub 110, such as a communication routine. The LLC 420 performs several miscellaneous tasks, such as initialization, attachment support, bandwidth control, and token planning. The LLC 420 orchestrates device initialization, including the initialization of the other layers in the software architecture 400, upon power-up.

The LLC 420 provides attachment support by providing attachment opportunities for unattached PEAs to attach to the Hub 110 so that they can communicate, providing MAC address assignment, and initializing an NI 430 and the layers below it for communication with a PEA 120. The LLC 420 provides bandwidth control through token planning. Through the use of tokens, the LLC 420 allocates bandwidth to permit one PEA 120 at a time to communicate with the Hub 110.

The NI 430 acts on its own behalf, or for an application 410 layer above it, to deliver data to the LLT 440 beneath it. The LLT 440 provides an ordered, reliable "snippet" (i.e., a data block) delivery service for the NI 430 through the use of encoding (e.g., 16-64 bytes of data plus a cyclic redundancy check (CRC)) and snippet retransmission. The LLT 440 accepts snippets, in order, from the NI 430 and delivers them using encoded status blocks (e.g., up to 2 bytes of status information translated through Forward Error Correction (FEC) into 6 bytes) for acknowledgments (ACKs).

The LLD 450 is the lowest level of software in the software architecture 400. The LLD 450 interacts with the DCL hardware 460. The LLD 450 initializes and updates data transfers via the DCL hardware 460 as it delivers and receives data blocks for the LLT 440, and processes hardware interrupts. The DCL hardware 460 is the hardware driven by the LLD 450.

Figure 5:
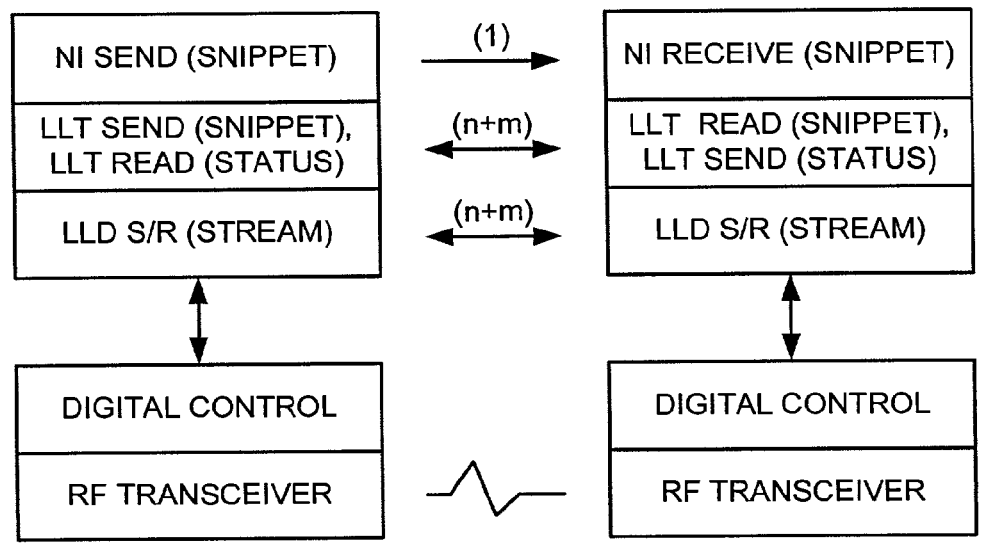
FIG. 5 is an exemplary diagram of communication processing by the layers of the software architecture of FIG. 4.

FIG. 5 is an exemplary diagram of communication processing by the layers of the software architecture 400 of FIG. 4. In FIG. 5, the exemplary communications involve the transmission of a snippet from one node to another. This example assumes that the sending node is the Hub 110 and the receiving node is a PEA 120. Processing begins with the NI 430 of the Hub 110 deciding to send one or more bytes (but no more than will fit) in a snippet. The NI 430 exports the semantics that only one transaction is required to transmit these bytes to their destination (denoted by "(1)" in the figure). The NI 430 sends a unique identifier for the destination PEA 120 of the snippet to the LLT 440. The LLT 440 maps the PEA identifier to the MAC address assigned to the PEA 120 by the Hub 110.

The LLT 440 transmits the snippet across the network to the receiving device. To accomplish this, the LLT 440 adds header information (to indicate, for example, how many bytes in the snippet are padded bytes) and error checking information to the snippet, and employs reverse-direction status/acknowledgment messages and retransmissions. This is illustrated in FIG. 5 by the bidirectional arrow between the LLT 440 layers marked with "(n+m)." The number n of snippet transmissions and the number m of status transmissions in the reverse direction are mostly a function of the amount of noise in the wireless communication, which may be highly variable. The LLT 440 may also encrypt portions or all of the snippet using known encryption technology.

The LLT 440 uses the LLD 450 to provide a basic block and stream-oriented communications service, isolating the DCL 460 interface from the potentially complex processing required of the LLT 440. The LLT 440 uses multiple stream numbers to differentiate snippet and status blocks so that the LLD 450 need not know which blocks contain what kind of content. The LLD 450 reads and writes the hardware DCL 460 to trigger the transmission and reception of data blocks. The PEA LLT 440, through the PEA LLD 450, instructs the PEA DCL 460 which MAC address or addresses to respond to, and which stream numbers to respond to for each MAC address. The Hub LLT 440, through the Hub LLD 450, instructs the Hub DCL 460 which MAC addresses and stream numbers to combine into tokens and transmit so that the correct PEA 120 will respond. The Hub DCL 460 sends and receives (frequently in a corrupted form) the data blocks across the RF network via the Hub RF transceiver 230 (FIG. 2).

The Hub LLT 440 employs FEC for status, checksums and error checking for snippets, and performs retransmission control for both to ensure that each snippet is delivered reliably to its client (e.g., PEA LLT 440). The PEA LLT 440 delivers snippets in the same order that they were sent by the Hub NI 430 to the PEA NI 430. The PEA NI 430 takes the one or more bytes sent in the snippets and delivers them in order to the higher-level application 410, thereby completing the transmission.

Exemplary DCL Data Block Architecture

Figure 6:
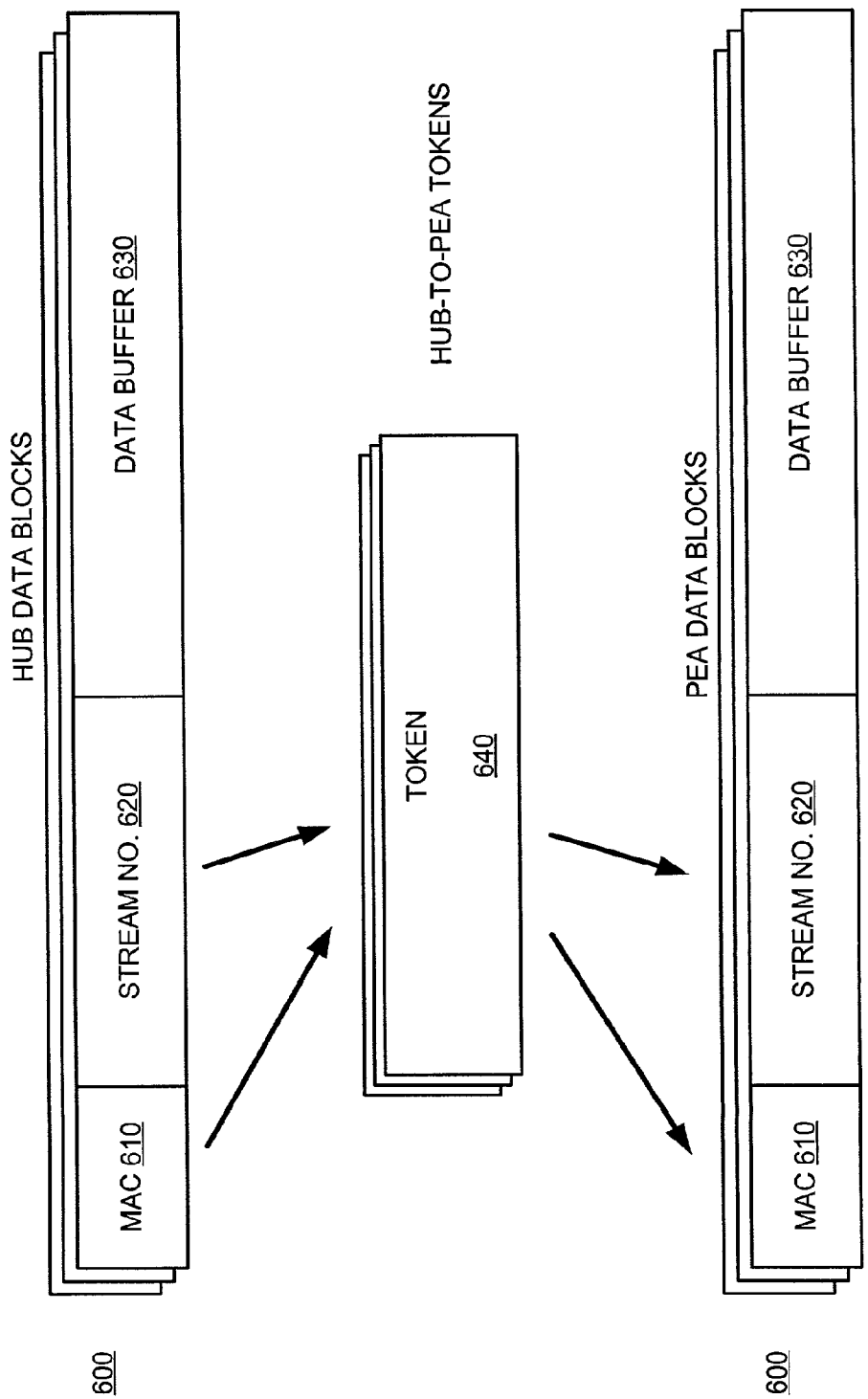
FIG. 6 is an exemplary diagram of a data block architecture within the DCL of the Hub and PEA in an implementation consistent with the present invention.

FIG. 6 is an exemplary diagram of a data block architecture 600 within the DCL of the Hub 110 and the PEA 120. The data block 600 contains a MAC address 610 designating a receiving or sending PEA 120, a stream number 620 for the communication, and a data buffer 630 which is full when sending and empty when receiving. As will be described later, the MAC address 610 and stream number 620 form the contents of a token 640. When the LLD 450 reads from and writes to the hardware DCL 46.0, the LLD 450 communicates the MAC address 610 and stream number 620 with the data buffer 630. When a PEA 120 receives a data block, the DCL 460 places the MAC address 610 and stream number 620 contained in the preceding token 640 in the data block 600 to keep track of the different data flows.

Exemplary Stream Architecture

The LLD 450 provides a multi-stream data transfer service for the LLT 440. While the LLT 440 is concerned with data snippets and status/acknowledgements, the LLD 450 is concerned with the size of data blocks and the direction of data transfers to and from the Hub 110.

Figure 7A:
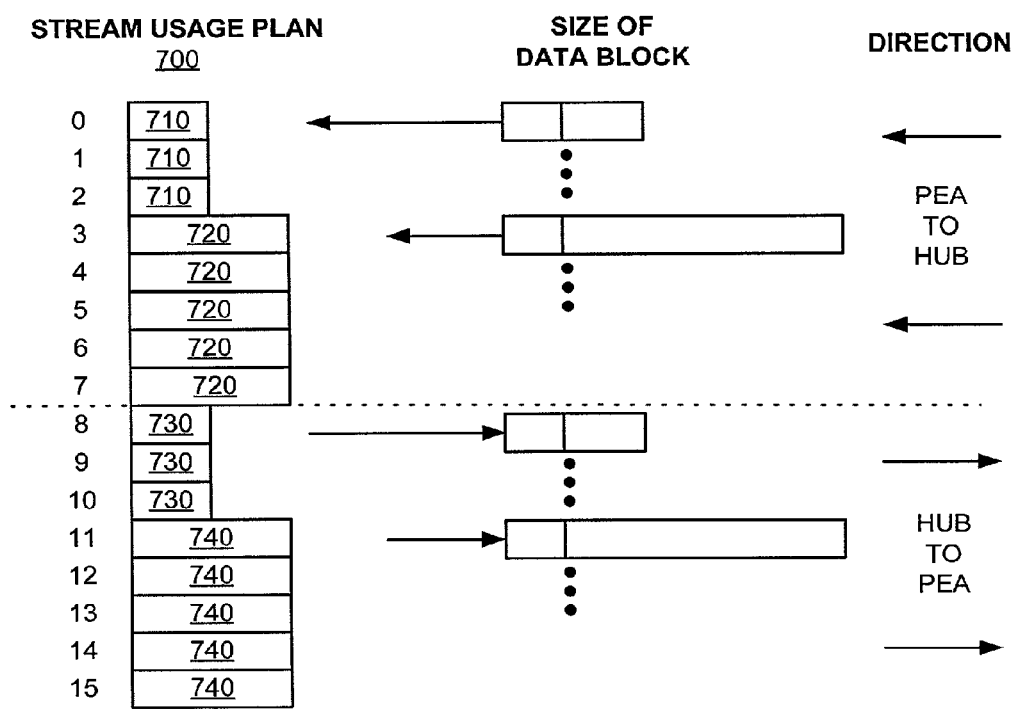
FIG. 7A is a detailed diagram of an exemplary stream usage plan in an implementation consistent with the present invention.

FIG. 7A is a detailed diagram of an exemplary stream usage plan 700 in an implementation consistent with the present invention. A single stream usage plan may be predefined and used by the Hub 110 and all PEAs 120. The PEA 120 may have a different set of active streams for each MAC address it supports, and only responds to a token that specifies a MAC address of the PEA 120 and a stream that is active for that MAC address. In an implementation consistent with the present invention, every PEA 120 may support one or more active Hub-to-PEA streams associated with the Hub's MAC address.

The stream usage plan 700 includes several streams 710-740, each having a predefined size and data transfer direction. The plan 700 may, of course, have more or fewer entries and may accommodate more than the two data block sizes shown in the figure. In the plan 700, streams 0-2 (710) are used to transmit the contents of small data blocks from the PEA 120 to the Hub 110. Streams 3-7 (720) are used to transmit the contents of larger data blocks from the PEA 120 to the Hub 110. Streams 8-10 (730), on the other hand, are used to transmit the contents of small data blocks from the Hub 110 to the PEA 120. Streams 11-15 (740) are used to transmit the contents of larger data blocks from the Hub 110 to the PEA 120.

To avoid collisions, some of the streams are reserved for PEAs desiring to attach to the network and the rest are reserved for PEAs already attached to the network. With such an arrangement, a PEA 120 knows whether and what type of communication is scheduled by the Hub 110 based on a combination of the MAC address 610 and the stream number 620.

Figure 7B:
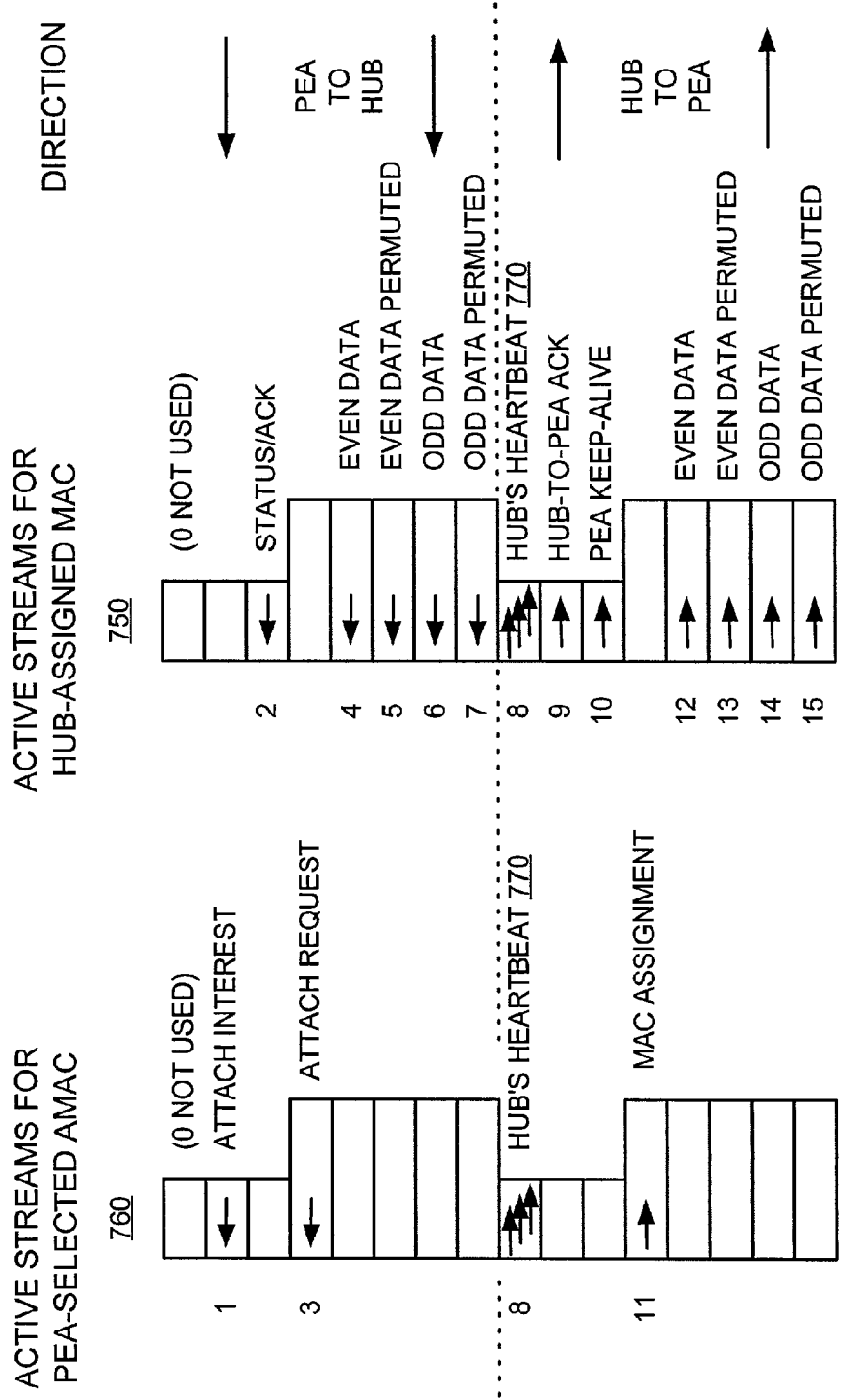
FIG. 7B is a detailed diagram of an exemplary stream usage assignment in an implementation consistent with the present invention.

FIG. 7B is a detailed diagram of an exemplary stream usage assignment by the LLT 440 in an implementation consistent with the present invention. The LLT 440 assigns different streams to different communication purposes, reserving the streams with small block size for status, and using the streams with larger block size for snippets. For example, the LLT 440 may use four streams (4-7 and 12-15) for the transmission of snippets in each direction, two for odd parity snippets and two for even parity snippets. In other implementations consistent with the present invention, the LLT 440 uses different numbers of streams of each parity and direction.

The use of more than one stream for the same snippet allows a snippet to be sent in more than one form. For example, the LLT 440 may send a snippet in its actual form through one stream and in a form with bytes complemented and in reverse order through the other stream. The alternating use of different transformations of a snippet more evenly distributes transmission errors among the bits of the snippet as they are received, and hence facilitates the reconstruction of a snippet from multiple corrupted received versions. The receiver always knows which form of the snippet was transmitted based on its stream number.

The LLT 440 partitions the streams into two disjoint subsets, one for use with Hub 110 assigned MAC addresses 750 and the other for use with attaching PEAs' self-selected MAC addresses (AMACs) 760. Both the LLT 440 and the LLD 450 know the size and direction of each stream, but the LLT 450 is responsible for determining how the streams are used, how MAC numbers are assigned and used, and assuring that no two PEAs 120 respond to the same token (containing a MAC address and stream number) transmitted by the Hub 110. One exception to this includes the Hub's use of its MAC address to broadcast its heartbeat 770 (described below) to all PEAs 120.

Exemplary Communication

Figure 8:
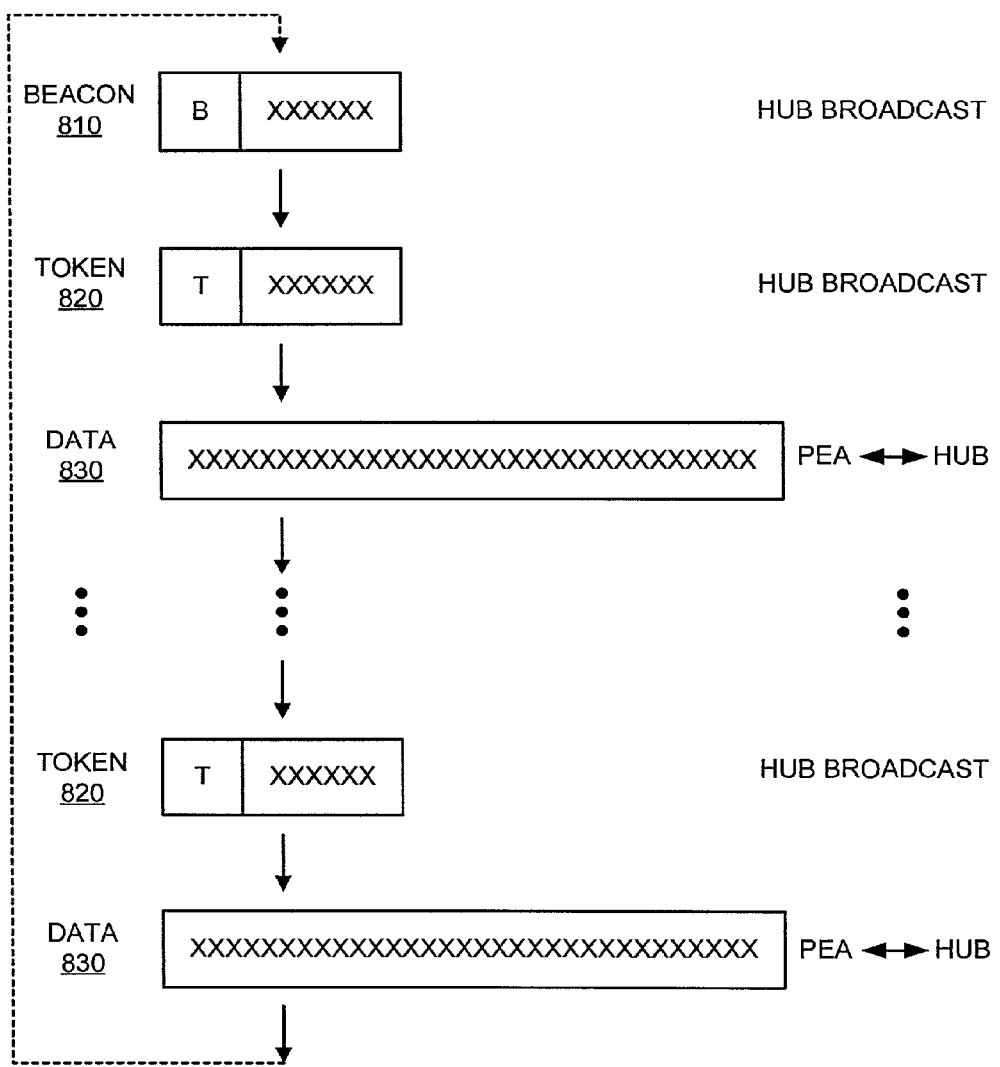
FIG. 8 is an exemplary diagram of a time division multiple access (TDMA) frame structure in an implementation consistent with the present invention.

FIG. 8 is an exemplary diagram of a TDMA frame structure 800 of a TDMA plan consistent with the present invention. The TDMA frame 800 starts with a beacon 810, and then alternates token broadcasts 820 and data transfers 830. The Hub 110 broadcasts the beacon 810 at the start of each TDMA frame 800. The PEAs 120 use the beacon 810, which may contain a unique identifier of the Hub 110, to synchronize to the Hub 110.

Each token 640 (FIG. 6) transmitted by the Hub 110 in a token broadcast 820 includes a MAC address 610 (FIG. 6) and a stream number 620 for the data buffer 630 transfer that follows. The MAC address 610 and stream number 620 in the token 640 together specify a particular PEA 120 to transmit or receive data, or, in the case of the Hub's MAC address 610, specify no, many, or all PEAs to receive data from the Hub 110 (depending on the stream number). The stream number 620 in the token 640 indicates the direction of the data transfer 830 (Hub 110 to PEA 120 or PEA 120 to Hub 110), the number of bytes to be transferred, and the data source (for the sender) and the appropriate empty data block (for the receiver).

The TDMA plan controls the maximum number of bytes that can be sent in a data transfer 830. Not all of the permitted bytes need to be used in the data transfer 830, however, so the Hub 110 may schedule a status block in the initial segment of a TDMA time interval that is large enough to send a snippet. The Hub 110 and PEA 120 treat any left over bytes as no-ops to mark time. Any PEA 120 not involved in the data transfer uses all of the data transfer 830 bytes to mark time while waiting for the next token 640. The PEA 120 may also power down non-essential circuitry at this time to reduce power consumption.

Figure 9A:
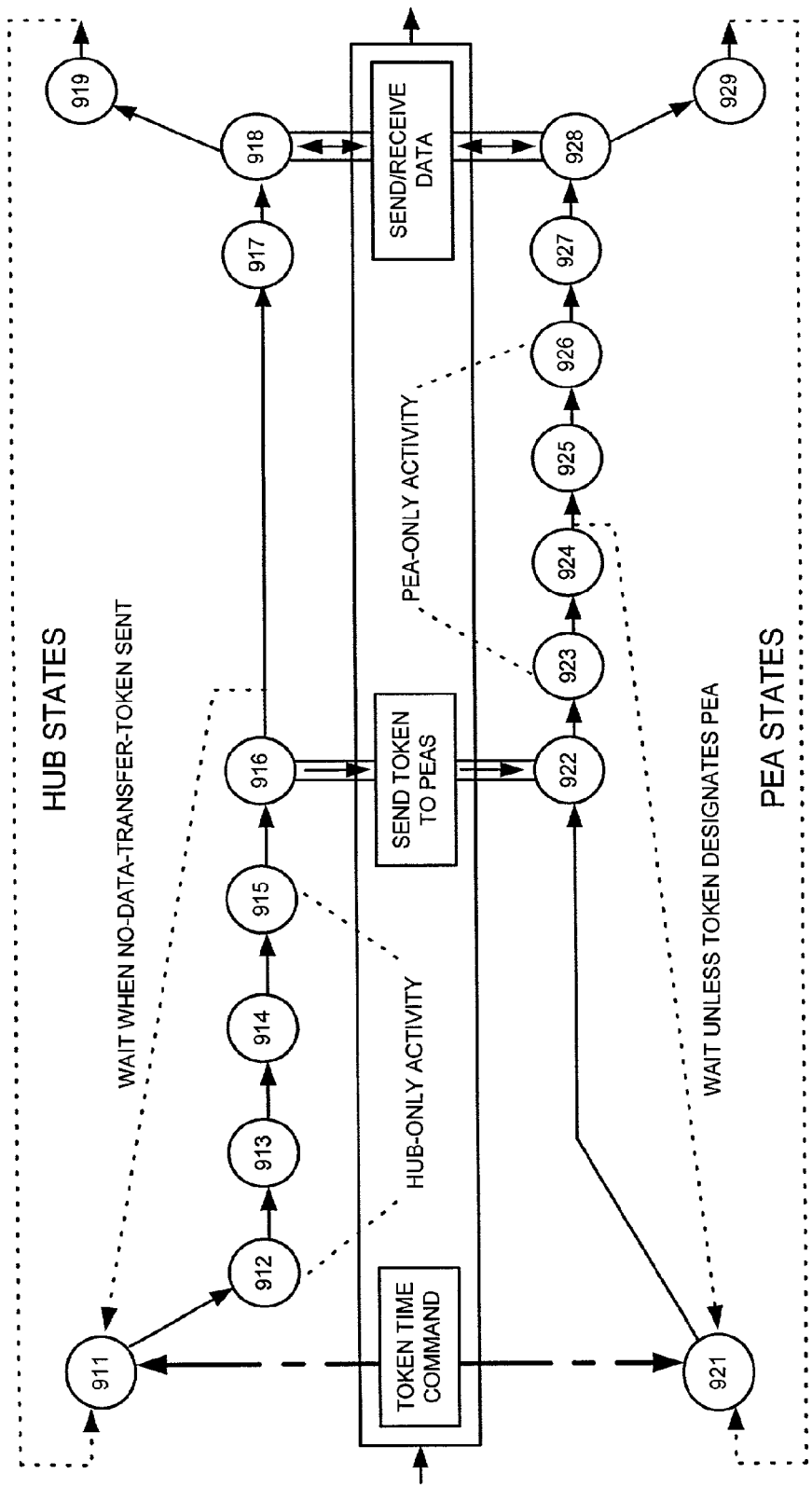
FIG. 9A is a detailed diagram of activity within the Hub and PEA according to a TDMA plan consistent with the present invention.
Figure 9B:
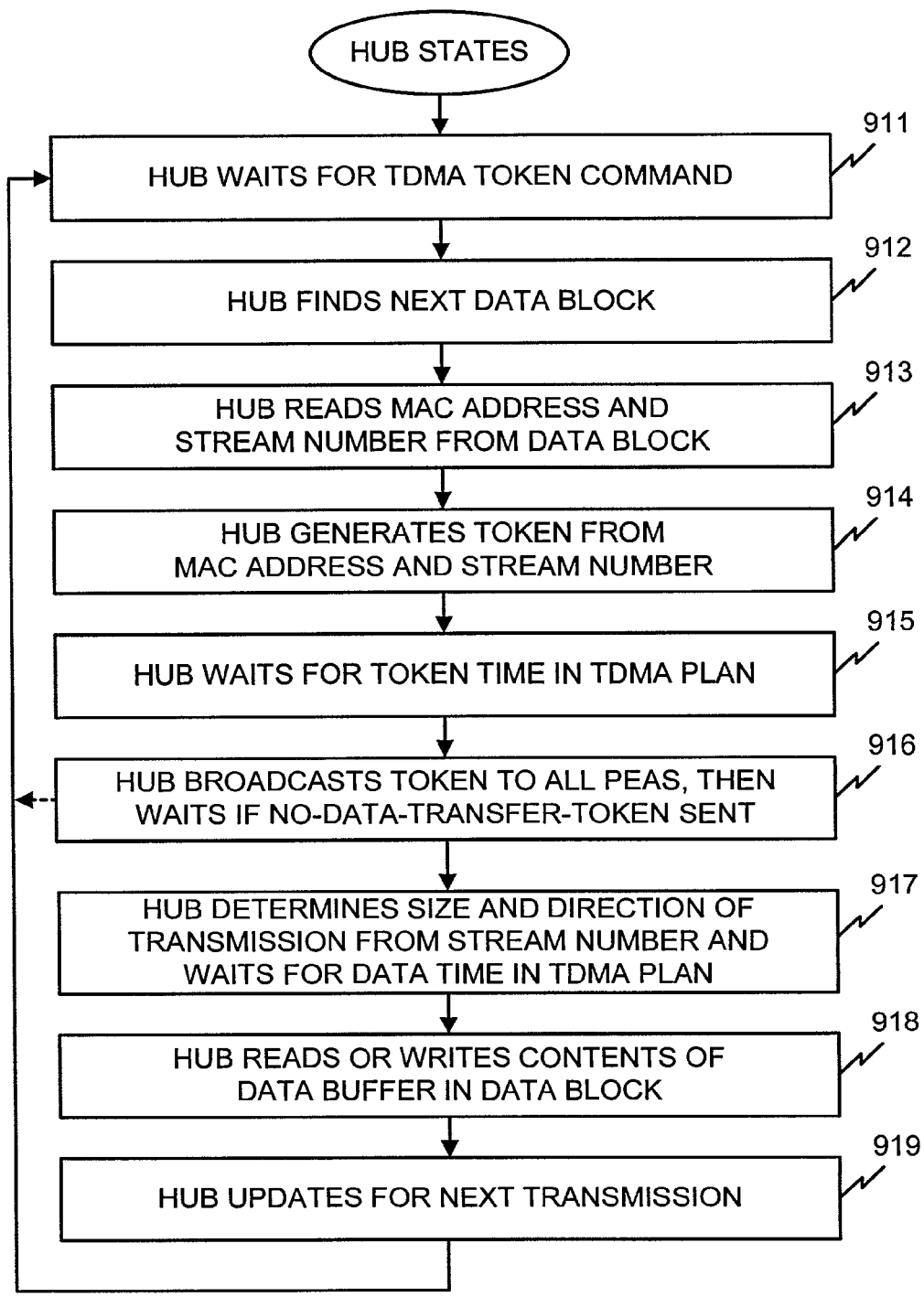
FIG. 9B is a flowchart of the Hub activity of FIG. 9A.
Figure 9C:
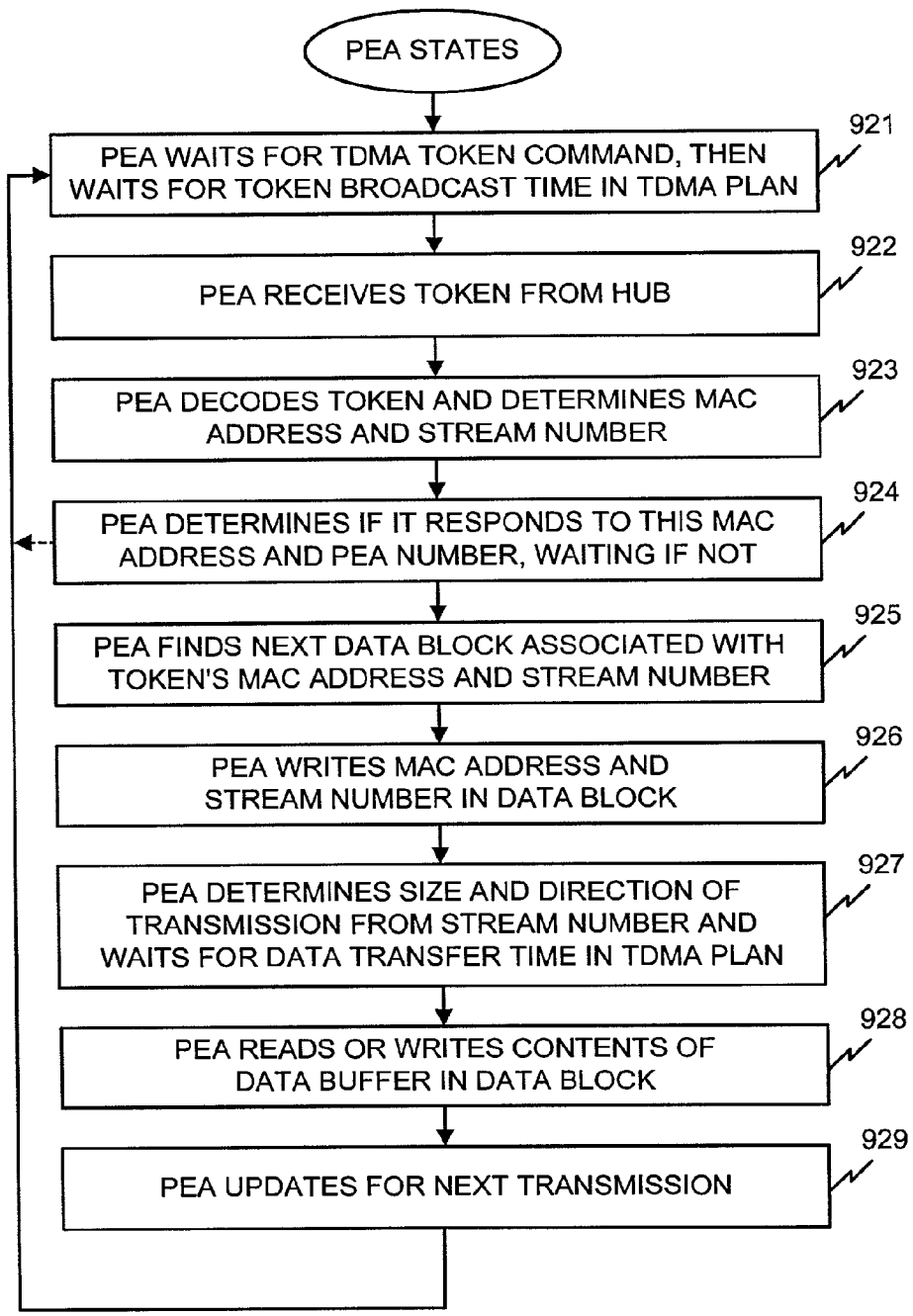
FIG. 9C is a flowchart of the PEA activity of FIG. 9A.

FIG. 9A is an exemplary diagram of communication processing for transmitting a single data block from the Hub 110 to a PEA 120 according to the TDMA plan of FIG. 8. FIGS. 9B and 9C are flowcharts of the Hub 110 and PEA 120 activities, respectively, of FIG. 9A. The reference numbers in FIG. 9A correspond to the flowchart steps of FIGS. 9B and 9C.

With regard to the Hub activity, the Hub 110 responds to a token command in the TDMA plan [step 911] (FIG. 9B) by determining the location of the next data block 600 to send or receive [step 912]. The Hub 110 reads the block's MAC address 610 and stream number 620 [step 913] and generates a token 640 from the MAC address and stream number using FEC [step 914]. The Hub 110 then waits for the time for sending a token 640 in the TDMA plan (i.e., a token broadcast 820 in FIG. 8) [step 915] and broadcasts the token 640 to the PEAs 120 [step 916]. If the stream number 620 in the token 640 is zero (i.e., a NO-DATA-TRANSFER token), no PEA 120 will respond and the Hub 110 waits for the next token command in the TDMA plan [step 911].

If the stream number 620 is non-zero, however, the Hub 110 determines the size and direction of the data transmission from the stream number 620 and waits for the time for sending the data in the TDMA plan (i.e., a data transfer 830) [step 917]. Later, when instructed to do so by the TDMA plan (i.e., after the PEA 120 identified by the MAC address 610 has had enough time to prepare), the Hub 110 transmits the contents of the data buffer 630 [step 918]. The Hub 110 then prepares for the next token command in the TDMA plan [step 919].

With regard to the PEA activity, the PEA 120 reaches a token command in the TDMA plan [step 921] (FIG. 9C). The PEA 120 then listens for the forward error-corrected token 640, having a MAC address 610 and stream number 620, transmitted by the Hub 110 [step 922]. The PEA 120 decodes the MAC address from the forward error-corrected token [step 923] and, if it is not the PEA's 120 MAC address, sleeps through the next data transfer 830 in the TDMA plan [step 924]. Otherwise, the PEA 120 also decodes the stream number 620 from the token 640.

All PEAs 120 listen for the Hub heartbeat that the Hub 110 broadcasts with a token containing the Hub's MAC address 610 and the heartbeat stream 770. During attachment (described in more detail below), the PEA 120 may have two additional active MAC addresses 610, the one it selected for attachment and the one the Hub 110 assigned to the PEA 120. The streams are partitioned between these three classes of MAC addresses 610, so the PEA 120 may occasionally find that the token 640 contains a MAC address 610 that the PEA 120 supports, but that the stream number 620 in the token 640 is not one that the PEA 120 supports for this MAC address 610. In this case, the PEA 120 sleeps through the next data transfer 830 in the TDMA plan [step 924].

Since the PEA 120 supports more than one MAC address 610, the PEA 120 uses the MAC address 610 and the stream number 620 to identify a suitable empty data block [step 925]. The PEA 120 writes the MAC address 610 and stream number 620 it received in the token 640 from the Hub 110 into the data block [step 926]. The PEA 120 then determines the size and direction of the data transmission from the stream number 620 and waits for the transmission of the data buffer 630 contents from the Hub 110 during the next data transfer 830 in the TDMA plan [step 927]. The PEA 120 stores the data in the data block [step 928], and then prepares for the next token command in the TDMA plan [step 929].

FIGS. 9A-9C illustrate communication of a data block from the Hub 110 to a PEA 120. When the PEA 120 transfers a data block to the Hub 110, similar steps occur except that the Hub 110 first determines the next data block to receive (with its MAC address 610 and stream number 620) and the transmission of the data buffer 630 contents occurs in the opposite direction. The Hub 110 needs to arrange in advance for receiving data from PEAs 120 by populating the MAC address 610 and stream number 620 into data blocks with empty data buffers 630, because the Hub 110 generates the tokens for receiving data as well as for transmitting data.

Figure 10A:
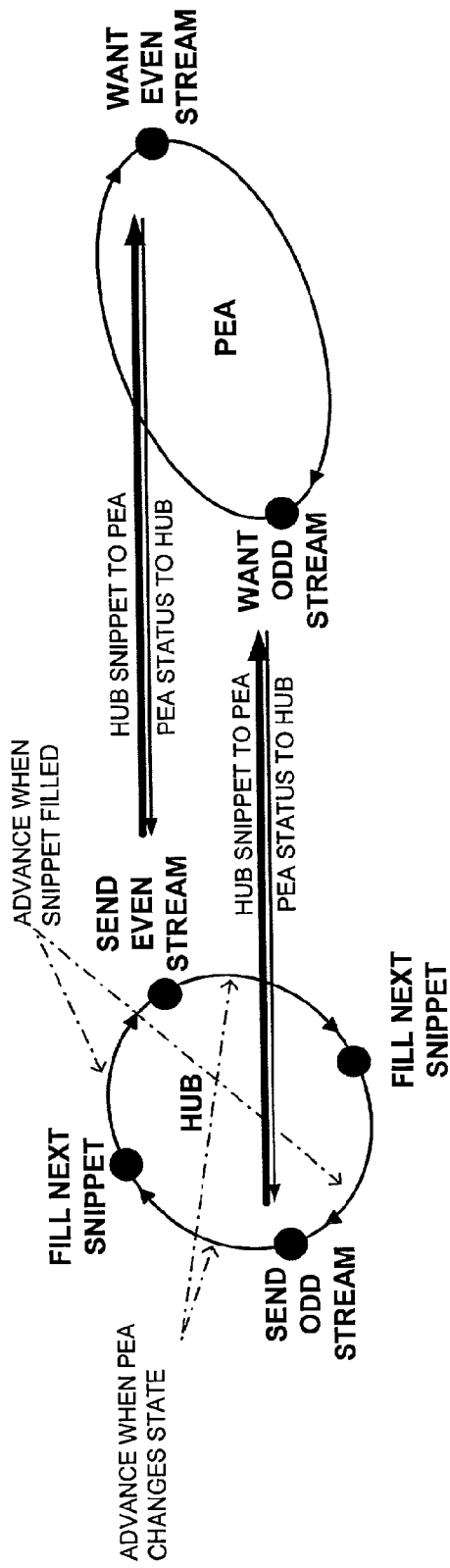
FIGS. 10A and 10B are high-level diagrams of states that the Hub and PEA traverse during a data transfer in an implementation consistent with the present invention.
Figure 10B:
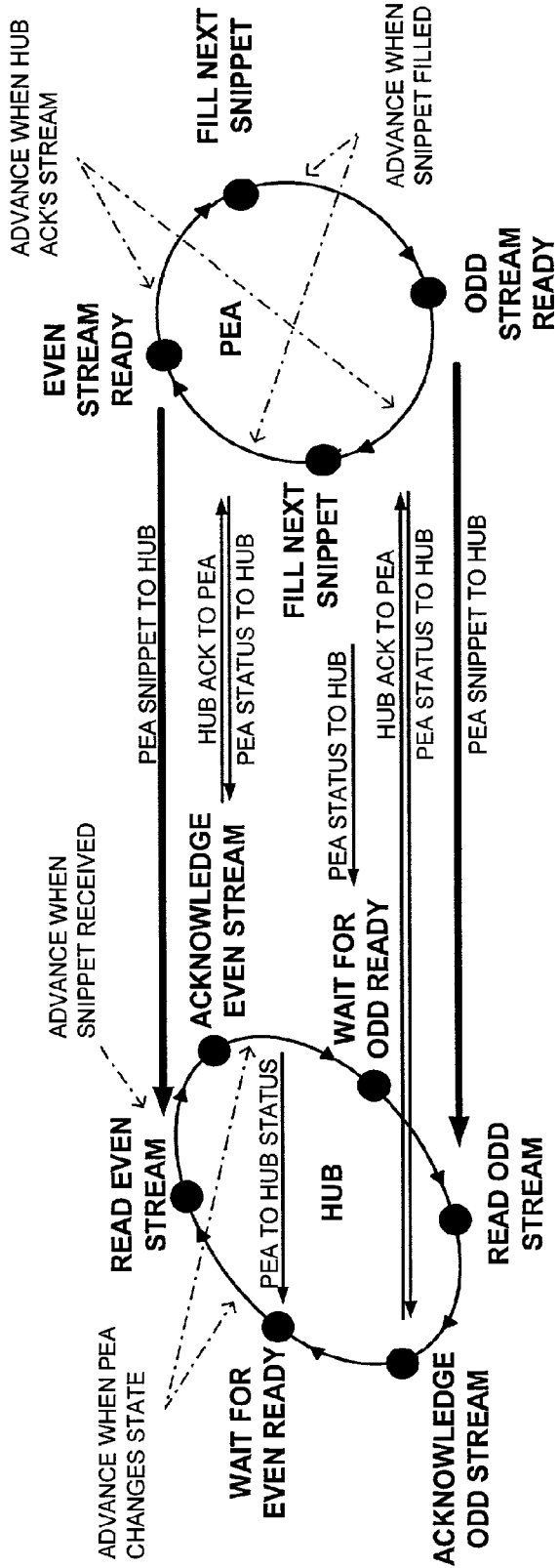

FIGS. 10A and 10B are high-level diagrams of the states that the Hub 110 and PEA 120 LLT 440 (FIG. 4) go through during a data transfer in an implementation consistent with the present invention. FIG. 10A illustrates states of a Hub-to-PEA transfer and FIG. 10B illustrates states of a PEA-to-Hub transfer.

During the Hub-to-PEA transfer (FIG. 10A), the Hub 110 cycles through four states: fill, send even parity, fill, and send odd parity. The fill states indicate when the NI 430 (FIG. 4) may fill a data snippet. The even and odd send states indicate when the Hub 110 sends even numbered and odd numbered snippets to the PEA 120. The PEA 120 cycles through two states: want even and want odd. The two states indicate the PEA's 120 desire for data, with 'want even' indicating that the last snippet successfully received had odd parity. The PEA 120 communicates its current state to the Hub 110 via its status messages (i.e., the state changes serve as ACKs). The Hub 110 waits for a state change in the PEA 120 before it transitions to its next fill state.

During the PEA-to-Hub transfer (FIG. 10B), the Hub 110 cycles through six states: wait/listen for PEA-ready-to-send-even status, read even, send ACK and listen for status, wait/listen for PEA-ready-to-send-odd status, read odd, and send ACK and listen for status. According to this transfer, the PEA 120 cannot transmit data until the Hub 110 requests data, which it will only do if it sees from the PEA's status that the PEA 120 has the next data block ready.

The four listen for status states schedule when the Hub 110 asks to receive a status message from the PEA 120. The two 'send ACK and listen for status' states occur after successful receipt of a data block by the Hub 110, and in these two states the Hub 110 schedules both the sending of Hub status to the PEA 120 and receipt of the PEA status. The PEA status informs the Hub 110 when the PEA 120 has successfully received the Hub 110 status and has transitioned to the next 'fill' state.

Once the PEA 120 has prepared its next snippet, it changes its status to 'have even' or 'have odd' as appropriate. When the Hub 110 detects that the PEA 120 has advanced to the fill state or to 'have even/odd,' it stops scheduling the sending of Hub status (ACK) to the PEA 120. If the Hub 110 detects that the PEA 120 is in the 'fill' state, it transitions to the following 'listen for status' state. If the PEA 120 has already prepared a new snippet for transmission by the time the Hub 110 learns that its ACK was understood by the PEA 120, the Hub 110 skips the 'listen for status' state and moves immediately to the next appropriate 'read even/odd' state. In this state, the Hub 110 receives the snippet from the PEA 120.

The PEA 120 cycles through four states: fill, have even, fill, and have odd (i.e., the same four states the Hub 110 cycles through when sending snippets). The fill states indicate when the NI 430 (FIG. 4) can fill a data snippet. During the fill states, the PEA 110 sets its status to 'have nothing to send.' The PEA 120 does not transition its status to 'have even' or 'have odd' until the next snippet is filled and ready to send to the Hub 110. These two status states indicate the parity of the snippet that the PEA 120 is ready to send to the Hub 110. When the Hub 110 receives a status of 'have even' or 'have odd' and the last snippet it successfully received had the opposite parity, it schedules the receipt of data, which it thereafter acknowledges with a change of status that it sends to the PEA 120.

Exemplary Attachment Processing

The Hub 110 communicates with only attached PEAs 120 that have an assigned MAC address 610. An unattached PEA can attach to the Hub 110 when the Hub 110 gives it an opportunity to do so. Periodically, the Hub 110 schedules attachment opportunities for unattached PEAs that wish to attach to the Hub 110, using a small set of attach MAC (AMAC) addresses and a small set of streams dedicated to this purpose.

After selecting one of the designated AMAC addresses 610 at random to identify itself and preparing to send a small, possibly forward error-corrected, "attach-interest" message and a longer, possibly checksummed, "attach-request" message using this AMAC and the proper attach stream numbers 620, the PEA 120 waits for the Hub 110 to successfully read the attach-interest and then the attach-request messages. Reading of a valid attach-interest message by the Hub 110 causes the Hub 110 believe that there is a PEA 120 ready to send the longer (and hence more likely corrupted) attach-request.

Once a valid attach-interest is received, the Hub 110 schedules frequent receipt of the attach-request until it determines the contents of the attach-request, either by receiving the block intact with a valid checksum or by reconstructing the sent attach-request from two or more received instances of the sent attach-request. The Hub 110 then assigns a MAC address to the PEA 120, sending the address to the PEA 120 using its AMAC address.

The Hub 110 confirms receipt of the MAC address by scheduling the reading of a small, possibly forward error-corrected, attach-confirmation from the PEA 120 at its new MAC address 610. The Hub 110 follows this by sending a small, possibly forward error-corrected, confirmation to the PEA 120 at its MAC address so that the PEA 120 knows it is attached. The PEA 120 returns a final small, possibly forward error-corrected, confirmation acknowledgement to the Hub 110 so that the Hub 110, which is in control of all scheduled activity, has full knowledge of the state of the PEA 120. This MAC address remains assigned to that PEA 120 for the duration of the time that the PEA 120 is attached.

Figure 11:
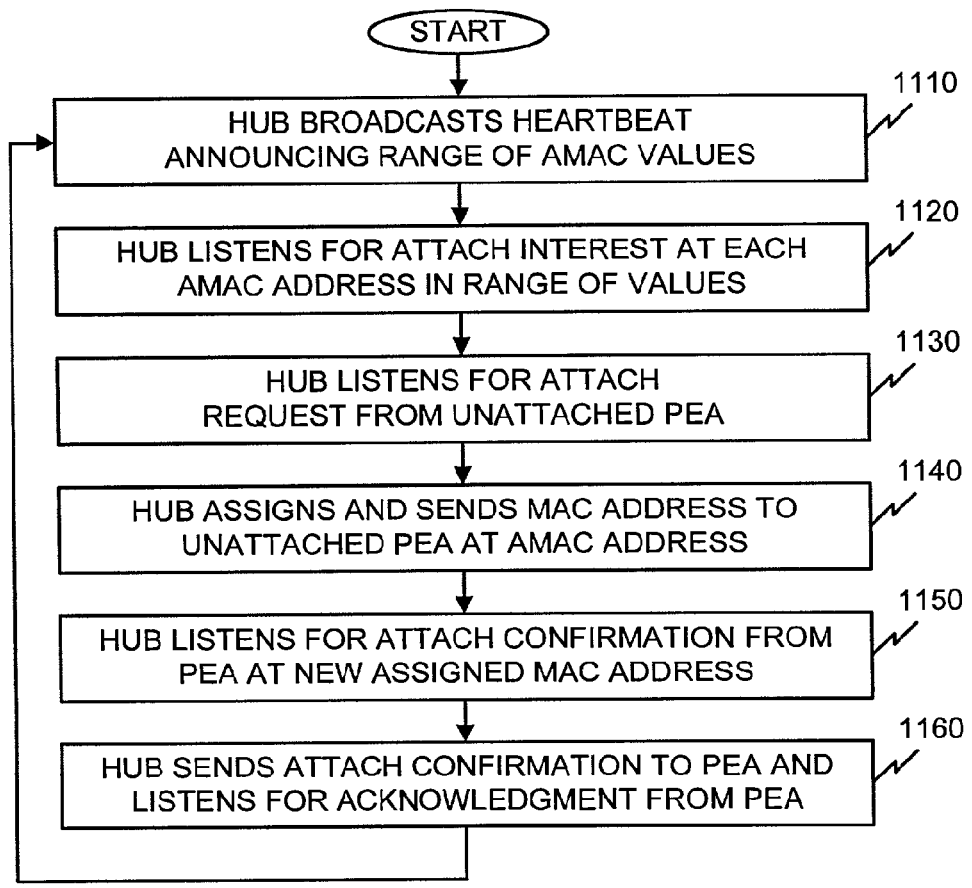
FIGS. 11 and 12 are flowcharts of Hub and PEA attachment processing, respectively, consistent with the present invention.
Figure 12:
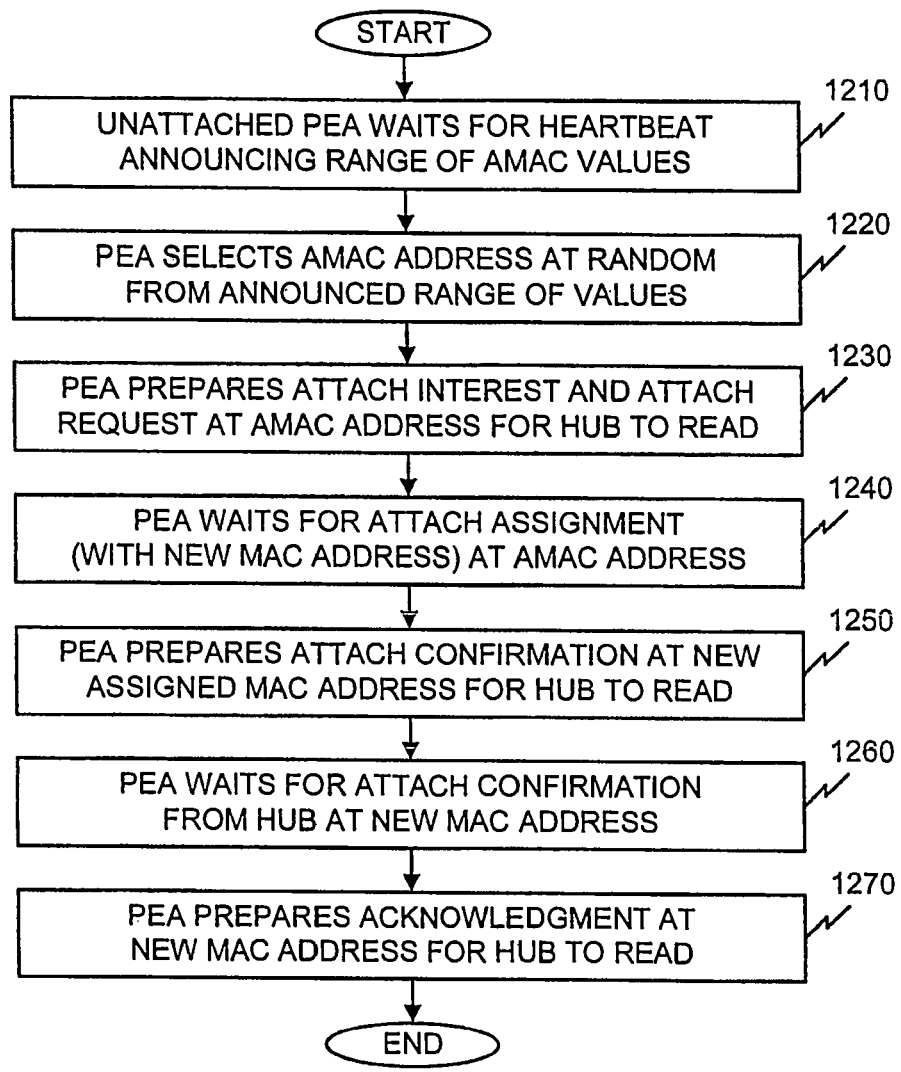

FIGS. 11 and 12 are flowcharts of Hub and PEA attachment processing, respectively, consistent with the present invention. When the Hub 110 establishes the network, its logic initializes the attachment process and, as long as the Hub 110 continues to function, periodically performs attachment processing. The Hub 110 periodically broadcasts heartbeats containing a Hub identifier (selecting a new heartbeat identifier value each time it reboots) and an indicator of the range of AMACs that can be selected from for the following attach opportunity [step 1110] (FIG. 11). The Hub 110 schedules an attach-interest via a token that schedules a small PEA-to-Hub transmission for each of the designated AMACs, so unattached PEAs may request attachment.

Each attaching PEA 120 selects a new AMAC at random from the indicated range when it hears the heartbeat. Because the Hub 110 may receive a garbled transmission whenever more than one PEA 120 transmits, the Hub 110 occasionally indicates a large AMAC range (especially after rebooting) so that at least one of a number of PEAs 120 may select a unique AMAC 610 and become attached. When no PEAs 120 have attached for some period of time, however, the Hub 110 may select a small range of AMACs 610 to reduce attachment overhead, assuming that PEAs 120 will arrive in its vicinity in at most small groups. The Hub 110 then listens for a valid attach-interest from an unattached PEA [step 1120]. The attach-interest is a PEA-to-Hub message having the AMAC address 610 selected by the unattached PEA 120.

Upon receiving a valid attach interest, the Hub 110 schedules a PEA-to-Hub attach-request token with the PEA's AMAC 610 and reads the PEA's attach-request [step 1130]. Due to the low-power wireless environment of the PAN 100, the attach-request transmission may take more than one attempt and hence may require scheduling the PEA-to-Hub attach-request token more than once. When the Hub 110 successfully receives the attach-request from the PEA, it assigns a MAC address to the PEA [step 1140]. In some cases, the Hub 110 chooses the MAC address from the set of AMAC addresses.

The Hub 110 sends the new MAC address 610 in an attach-assignment message to the now-identified PEA 120, still using the PEA's AMAC address 610 and a stream number 620 reserved for this purpose. The Hub 110 schedules and listens for an attach-confirmation response from the PEA 120 using the newly assigned MAC address 610 [step 1150].

Upon receiving the confirmation from the PEA 120, the Hub 110 sends its own confirmation, acknowledging that the PEA 120 has switched to its new MAC, to the PEA 120 and waits for a final acknowledgment from the PEA 120 [step 1160]. The Hub 110 continues to send the confirmation until it receives the acknowledgment from the PEA 120 or until it times out. In each of the steps above, the Hub 110 counts the number of attempts it makes to send or receive, and aborts the attachment effort if a predefined maximum number of attempts is exceeded. Upon receiving the final acknowledgment, the Hub 110 stops sending its attach confirmation, informs its NI 430 (FIG. 4) that the PEA 120 is attached, and begins exchanging both data and keep-alive messages (described below) with the PEA 120.

When an unattached PEA 120 enters the network, its LLC 420 (FIG. 4) instructs its LLT 440 to initialize attachment. Unlike the Hub 110, the PEA 120 waits to be polled. The PEA 120 instructs its DCL 460 to activate and associate the heartbeat stream 770 (FIG. 7B) with the Hub's MAC address and waits for the heartbeat broadcast from the Hub 110 [step 1210] (FIG. 12). The PEA 120 then selects a random AMAC address from the range indicated in the heartbeat to identify itself to the Hub 110 [step 1220]. The PEA 120 instructs its DCL 460 to send an attach-interest and an attach-request data block to the Hub 110, and activate and associate the streams with its AMAC address [step 1230]. The PEA 120 tells its driver to activate and respond to the selected AMAC address for the attach-assignment stream.

The unattached PEA 120 then waits for an attach-assignment with an assigned MAC address from the Hub 110 [step 1240]. Upon receiving the attach-assignment, the PEA 120 finds its Hub-assigned MAC address and tells its driver to use this MAC address to send an attach-confirmation to the Hub 110 to acknowledge receipt of its new MAC address [step 1250], activate all attached-PEA streams for its new MAC address, and deactivate the streams associated with its AMAC address.

The PEA 120 waits for an attach confirmation from the Hub 110 using the new MAC address [step 1260] and, upon receiving it, sends a final acknowledgment to the Hub 110 [step 1270]. The PEA 120 then tells its NI 430 that it is attached.

The PEA 120, if it hears another heartbeat from the Hub 110 before it completes attachment, discards any prior communication and begins its attachment processing over again with a new AMAC.

Exemplary Detachment and Reattachment Processing

The Hub 110 periodically informs all attached PEAs 120 that they are attached by sending them 'keep-alive' messages. The Hub 110 may send the messages at least as often as it transmits heartbeats. The Hub 110 may send individual small, possibly forward error-corrected, keep-alive messages to each attached PEA 120 when few PEAs 120 are attached, or may send larger, possibly forward error-corrected, keep-alive messages to groups of PEAs 120.

Whenever the Hub 110 schedules tokens for PEA-to-Hub communications, it sets a counter to zero. The counter resets to zero each time the Hub 110 successfully receives a block (either uncorrupted or reconstructed) from the PEA 120, and increments for unreadable blocks. If the counter exceeds a predefined threshold, the Hub 110 automatically detaches the PEA 120 without any negotiation with the PEA 120. After this happens, the Hub 110 no longer schedules data or status transfers to or from the PEA 120, and no longer sends it any keep-alive messages.

Figure 13:
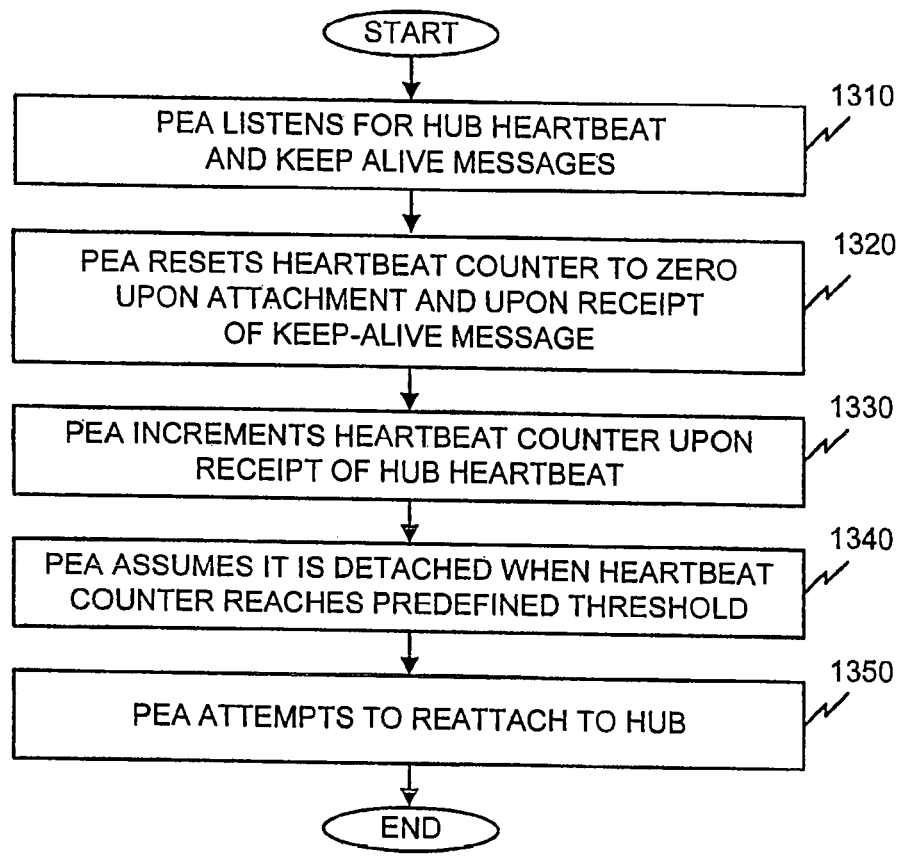
FIG. 13 is a flowchart of PEA detachment and reattachment processing consistent with the present invention.

FIG. 13 is a flowchart of PEA detachment and reattachment processing consistent with the present invention. Each attached PEA 120 listens for Hub heartbeat and keep-alive messages [step 1310]. When the PEA 120 first attaches, and after receiving each keep-alive message, it resets its heartbeat counter to zero [step 1320]. Each time the PEA 120 hears a heartbeat, it increments the heartbeat counter [step 1330]. If the heartbeat counter exceeds a predefined threshold, the PEA 120 automatically assumes that the Hub 110 has detached it from the network 100 [step 1340]. After this happens, the PEA 120 attempts to reattach to the Hub 110 [step 1350], using attachment processing similar to that described with respect to FIGS. 11 and 12.

If the Hub 110 had not actually detached the PEA 120, then the attempt to reattach causes the Hub 110 to detach the PEA 120 so that the attempt to reattach can succeed. When the PEA 120 is out of range of the Hub 110, it may not hear from the Hub 110 and, therefore, does not change state or increment its heartbeat counter. The PEA 120 has no way to determine whether the Hub 110 has detached it or how long the Hub 110 might wait before detaching it. When the PEA 120 comes back into range of the Hub 110 and hears the Hub heartbeat (and keep-alive if sent), the PEA 120 then determines whether it is attached and attempts to reattach if necessary.

Conclusion

Systems and methods consistent with the present invention provide a wireless personal area network that permit a host device to communicate with a varying number of peripheral devices with minimal power and minimal interference from neighboring networks by using a customized TDMA protocol. The host device uses tokens to facilitate the transmission of data blocks through the network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A hub device for use within a personal area network, comprising:
   circuitry, and
   a transceiver in communication with the circuitry, the hub device configured to cause the transceiver to
   i) send a message to indicate the availability of the hub device for attachment to a first peripheral device,
   ii) receive, from the first peripheral device, a message indicating the availability of the first peripheral device for communication with the hub device,
   iii) send, to the first peripheral device, a signal including a first peripheral device identifier,
   iv) receive, from the first peripheral device, a response,
   v) send a hub response to the first peripheral device, and
   vi) receive, from the first peripheral device, a second peripheral response including the first peripheral device identifier;
   wherein the hub device is operable such that a plurality of unique addresses is operable for being used for identification in association with the first peripheral device;
   wherein the hub device is operable such that a first one of the unique addresses is operable for being utilized in connection with a first attachment to the first peripheral device and a second one of the unique addresses is operable for being utilized for data transfer;
   wherein the hub device is operable such that the first one of the unique addresses is operable for being initially used in connection with the first attachment to the first peripheral device, after which the second one of the unique addresses is operable for being utilized for the data transfer;
   wherein the hub device is operable such that the first one of the unique addresses has a first one or more channels associated therewith with a capability of transferring a first size of communication and the second one of the unique addresses has a second one or more channels associated therewith with a capability of transferring a second size of communication different than the first size of communication.

2. The device according to claim 1, wherein the hub device is operable such that prior to an initiation of the first attachment, there is no communication between the first peripheral device and the hub device.

3. The device according to claim 1, wherein the hub device is operable such that the unique addresses include MAC addresses; and the hub device is operable such that the unique addresses are generated by the hub device.

4. The device according to claim 1, wherein the hub device is operable such that the unique addresses each uniquely identify the first peripheral device on a shared communication medium.

5. The device according to claim 1, wherein the hub device is operable such that the transceiver is caused to follow a protocol that involves a plurality of data blocks and a plurality of status blocks that each include a channel identifier, wherein the status blocks are utilized for controlling retransmission.

6. The device according to claim 1, wherein the hub device is operable for providing the first attachment in the personal area network such that i) occurs before ii), ii) occurs before iii), iv) occurs before v), v) occurs before vi), no other communications occur between ii)-iii), no other communications occur between iii)-iv), no other communications occur between iv)-v), and no other communications occur between v)-vi).

7. A peripheral device for use within a personal area network, comprising:
   circuitry, and
   a transceiver in communication with the circuitry, the peripheral device configured to cause the transceiver to
   i) receive a sent message from a hub device to indicate the availability of the hub device for attachment,
   ii) send, to the hub device, a message indicating the availability of the peripheral device for communication with the hub device,
   iii) receive, from the hub device, a signal including a peripheral device identifier,
   iv) send a response to the hub device,
   v) receive, from the hub device, a hub response, and
   vi) send, to the hub device, a second peripheral response including the peripheral device identifier;
   wherein the peripheral device is operable such that a plurality of unique addresses is operable for being used for identification in association therewith;
   wherein the peripheral device is operable such that a first one of the unique addresses is utilized in association with a first attachment to the hub device, after which a second one of the unique addresses is utilized for data transfer;
   wherein the peripheral device is operable such that the first one of the unique addresses has a first one or more channels associated therewith with a capability of transferring a first amount and the second one of the unique addresses has a second one or more channels associated therewith with a capability of transferring a second amount different than the first amount.

8. The device according to claim 7, wherein the peripheral device is operable such that i), ii), iii), iv), v), and vi) are carried out by a first entity; and i), ii), iii), iv), v), and vi) are further carried out by a second entity.

9. The device according to claim 8, wherein the peripheral device is operable such that the hub device associated with the first entity and the second entity includes the same hub device.

10. The device according to claim 7, wherein the peripheral device is operable such that the first one of the unique addresses is used for the first attachment without use of the second one of the unique addresses, after which the second one of the unique addresses is utilized.

11. A peripheral device, comprising:
    circuitry, and
    a transceiver in communication with the circuitry, the peripheral device configured to cause the transceiver to
        receive a sent message from a hub device to indicate the availability of the hub device for attachment,
        send, to the hub device, a message indicating the availability of the peripheral device for communication with the hub device,
        receive, from the hub device, a signal including a peripheral device identifier,
        send a response to the hub device,
        receive, from the hub device, a hub response, and
        send, to the hub device, a second peripheral response including the peripheral device identifier;
    wherein the peripheral device is operable such that a unique address is operable for being assigned by the peripheral device prior to a completion of attachment to the hub device for use in identifying the peripheral device in connection with a group associated with the hub device;
    wherein the peripheral device is operable such that a first one of a plurality of unique addresses has a first one or more channels associated therewith with a first data transfer capability associated therewith and a second one of the plurality of unique addresses has a second one or more channels associated therewith with a second data transfer capability associated therewith that is different than the first data transfer capability.

12. The device according to claim 11, wherein the peripheral device is configured such that a unique identifier is operable for being assigned by the hub device for use only in connection with the group associated with the hub device.

13. A device, comprising:
    a first entity configured to:
        receive a first entity-related other device message from at least one other device to indicate the availability of the at least one other device for attachment,
        send, to the at least one other device, a first entity-related message indicating the availability for communication with the at least one other device,
        receive, from the at least one other device, a first entity-related signal including a first entity-related device identifier,
        send a first entity-related response to the at least one other device,
        receive, from the at least one other device, a first entity-related other device response, and
        send, to the at least one other device, a first entity-related second response including the first entity-related device identifier; and
    a second entity configured to:
        receive a second entity-related other apparatus message from at least one other apparatus to indicate the availability of the at least one other apparatus for attachment,
        send, to the at least one other apparatus, a second entity-related message indicating the availability for communication with the at least one other apparatus,
        receive, from the at least one other apparatus, a second entity-related signal including a second entity-related device identifier,
        send a second entity-related response to the at least one other apparatus,
        receive, from the at least one other apparatus, a second entity-related other apparatus response, and
        send, to the at least one other apparatus, a second entity-related second response including the second entity-related device identifier;
    wherein the first entity is configured such that a particular unique address is operable for being assigned by the first entity prior to a completion of attachment to the at least one other device for use in identifying the first entity in connection with a group associated with the at least one other device.

14. The device according to claim 13, wherein the device is configured such that the first entity includes a first virtual entity and the second entity includes a second virtual entity.

15. The device according to claim 13, wherein the device is configured such that the first entity includes an associated first controller and the second entity includes an associated second controller.

16. The device according to claim 13, wherein the device is configured such that the first entity includes an associated first transceiver and the second entity includes an associated second transceiver.

17. The device according to claim 13, wherein the device is configured such that the at least one other device is the at least one other apparatus.

18. The device according to claim 13, wherein the device is configured such that the at least one other device or the at least one other apparatus includes at least one hub device, and the device includes a peripheral device.

19. The device according to claim 13, wherein the device is configured such that a first unique address is used for identification in association with the first entity and a second unique address is used for identification in association with the second entity.

20. The device according to claim 19, wherein the device is configured such that the first unique address uniquely identifies the first entity on a shared communication medium and the second unique address uniquely identifies the second entity on the shared communication medium.

21. The device according to claim 13, wherein the second entity is configured such that a plurality of unique addresses is operable for being used for identification in association therewith.

22. The device according to claim 21, wherein the second entity is configured such that a first one of the unique addresses has a first one or more channels associated therewith with a capability of transferring a first amount and a second one of the unique addresses has a second one or more channels associated therewith with a capability of transferring a second amount different than the first amount.

23. The device according to claim 22, wherein the second entity is configured such that the first one of the unique addresses is operable for being utilized for a first attachment to the second entity and the second one of the unique addresses is operable for being utilized for data transfer; the first one of the unique addresses is operable for being initially used for the first attachment to the second entity, after which the second one of the unique addresses is operable for being utilized; there is no communication between the second entity and the at least one other apparatus prior to an initiation of the first attachment; each send and receive capability of the second entity includes no communication therebetween; and each send and receive capability of the second entity is for attachment purposes in a personal area network.

24. The device according to claim 21, wherein the second entity is configured such that a first one of the unique addresses is operable for being selected by the second entity, a second one of the unique addresses is operable for being selected by the at least one other apparatus, and the first entity is configured such that the particular unique address is assigned by the first entity by being self-selected by the first entity.

25. The device according to claim 13, wherein the first entity is configured such that a unique identifier is operable for being assigned by the at least one other device for use only in connection with the group associated with the at least one other device.

26. The device according to claim 13, wherein the first entity is configured such that the particular unique address is operable for being assigned by the first entity by being selected from one or more already-existing unique addresses.

27. The device according to claim 13, wherein the first entity is configured such that the particular unique address remains assigned for only a duration of the attachment.

28. The device according to claim 13, wherein the first entity is configured such that the particular unique address remains assigned for a duration of the attachment of the first entity to the at least one other device.

29. The device according to claim 1, wherein the one or more channels includes at least one of: one or more links, or one or more streams; one of the plurality of unique addresses includes the first peripheral device identifier; the size relates to a block size; and the message to indicate the availability of the hub device for attachment to the first peripheral device indicates by indicating the availability of the hub device for attachment to any peripheral device.

30. The device according to claim 11, wherein the unique address is either the first one of the plurality of unique addresses or the second one of the plurality of unique addresses;

and the unique address is the first peripheral device identifier.

* * * * *